United States Patent
Ima

(10) Patent No.: US 7,201,074 B2
(45) Date of Patent: Apr. 10, 2007

(54) GEAR SHIFTING MECHANISM OF AXLE DRIVE SYSTEM

(76) Inventor: Akihiro Ima, 2-18-1, Inadera, Amagasaki-shi, Hyogo (JP)

( * ) Notice: Subject to any disclaimer, the term of this patent is extended or adjusted under 35 U.S.C. 154(b) by 175 days.

(21) Appl. No.: 11/007,586

(22) Filed: Dec. 9, 2004

(65) Prior Publication Data

US 2005/0139025 A1 Jun. 30, 2005

(30) Foreign Application Priority Data

Dec. 10, 2003 (JP) ............................ 2003-412230

(51) Int. Cl.
*F16H 3/38* (2006.01)
(52) U.S. Cl. ............................................. 74/339
(58) Field of Classification Search ............... 192/69.9, 192/48.9, 48.91; 74/339, 335
See application file for complete search history.

(56) References Cited

U.S. PATENT DOCUMENTS

| | | | | |
|---|---|---|---|---|
| 2,070,140 A | * | 2/1937 | Peterson et al. | 192/114 T |
| 2,186,653 A | * | 1/1940 | Penote | 74/470 |
| 2,761,325 A | * | 9/1956 | Short | 74/339 |
| 2,795,964 A | * | 6/1957 | Short | 74/339 |
| 4,305,309 A | * | 12/1981 | Ookubo et al. | 74/473.24 |
| 4,329,885 A | * | 5/1982 | Morscheck | 74/339 |
| 5,366,040 A | | 11/1994 | Irikura et al. | |
| 6,755,090 B2 | * | 6/2004 | Ima | 74/330 |
| 6,766,707 B2 | * | 7/2004 | Schupp | 74/339 |

FOREIGN PATENT DOCUMENTS

JP 2747803 2/1998

* cited by examiner

*Primary Examiner*—Dirk Wright
(74) *Attorney, Agent, or Firm*—Sterne, Kessler, Goldstein & Fox P.L.L.C.

(57) ABSTRACT

A gear shifting mechanism of an axle drive system comprises: a shaft drivingly connected to an axle; a first clutch gear relatively rotatably provided on the shaft, the first clutch gear having first clutch teeth; a second clutch gear relatively rotatably provided on the shaft, the second clutch gear having second clutch teeth; a spline hub fixed on the shaft between the first and second clutch gears; a gear shifting slider axially slidably and not relatively rotatably fitted on the spline hub; slider-shift means integrally movably interlocking with the gear shifting slider; operation means operatively interposed between the slider-shift means and a gear shifting manipulator; and elastic means interposed between the slider-shift means and the operation means. End surfaces of the first, second and third clutch teeth facing one another are flat. The elasticity of elastic means allows the movement of the slider-shift means relative to the operation means, and biases the third clutch teeth to engage with either the first or second clutch teeth.

12 Claims, 13 Drawing Sheets

(a)  Prior Art (b)  Prior Art

GEAR SHIFTING MECHANISM OF AXLE DRIVE SYSTEM

BACKGROUND OF THE INVENTION

1. Field of the Invention

The present invention relates to a gear shifting mechanism of an axle drive system, which is applicable to various industrial vehicles, such as trucks, agricultural tractors, riding mowers and construction equipments. The gear shifting mechanism is used for changing forward and backward traveling direction of a vehicle, or for changing a traveling speed level of a vehicle.

2. Related Art

There is a conventional axle drive system for various industrial vehicles, such as trucks, agricultural tractors, riding mowers and construction equipments, as disclosed in U.S. Pat. No. 5,366,040 and Japanese Patent No. 2,747,803. The conventional axle drive system includes a gear shifting mechanism having an axially slidable slider between axially opposite gears (any of them may be a sprocket). The slider and the opposite gears are provided with respective clutch teeth facing one another so that the clutch teeth of the slider selectively engage with the clutch teeth of one of the opposite clutch gears. The slider integrally movably engages with a shifter. As shown in the document '040, the shifter may have a shifter pawl fitted into a peripheral groove of the slider. The shifter is axially slidable on a fixed shifter shaft and interlockingly connected to a gear shifting manipulator (such as a lever) through a linkage including a rotary shaft, or alternatively, the shifter is fixed onto an axially slidable shifter shaft interlockingly connected to a gear shifting manipulator (such as a lever) through a linkage including a rotary shaft. Anyway, by manipulation of the manipulator, the rotary shaft is rotated, and the rotation is converted to axial movement of the shifter or the shifter shaft, thereby axially sliding the slider so as to engage with one of the opposite clutch gears.

If the conventional axle drive system is provided with a belt type stepless transmission which does not function as a reverser, as disclosed in the document '040, the gear shifting mechanism is disposed on the downstream of the belt type transmission, and a forward traveling clutch gear and a backward traveling sprocket serve as the opposite clutch gears. The slider selectively engages with either the forward traveling clutch gear and the backward traveling sprocket so as to switch forward/backward rotary direction of an axle.

If the conventional axle drive system is provided with a hydrostatic stepless transmission (hereinafter, referred to as "HST") which can function as a reverser, as disclosed in the document '803, the gear shifting mechanism is provided for expanding the speed changing range of the HST. The opposite clutch gears provide at least two (high and low) rotary speed stages of an axle.

FIG. 13(a) illustrates a part of a gear shifting mechanism constructed as the above (whether it may be provided for switching the traveling direction of a vehicle or the traveling speed stage of a vehicle). The gear shifting mechanism comprises opposite clutch gears 13A and 14A, a slider 16A disposed between the opposite clutch gears 13A and 14A, and a shifter 38A engaging with the slider 16A.

FIG. 13(b) illustrates clutch teeth 113a, 114a and 116a of respective opposite clutch gears 13A and 14A (forward and backward traveling clutch gears, or low and high speed clutch gears). The clutch teeth 113a, 114a and 116a are formed with chamfers 113b, 114b and 116b at ends thereof facing one another. Especially, each of the clutch teeth 116a of the slider 16A has the chamfers 116b on its opposite ends.

However, when the gear shifting operation is performed during traveling of a vehicle, the clutch teeth to engage with each other may collide with each other so as to be flipped out because rotation phases of the clutch teeth to engage with each other do not always agree with each other. In other words, the flipping is continued until the rotation phases agree with each other.

The flipping of the clutch teeth is transmitted from the gear shifting slider to the gear shifting manipulator through the shifter and the linkage, thereby discomforting an operator. Furthermore, the flipping damages the chamfers.

It is understood that the chamfers cause the flipping by themselves. In this regard, since the chamfers facilitate the mutually facing clutch teeth to engage with each other, the clutch teeth on one side enter the tooth spaces on the other side even if the rotation phases do not agree with each other, whereby the clutch teeth are flipped back.

If the end surfaces of the clutch teeth are formed to be flat so as to prevent the flipping, the clutch teeth must engage strictly at the moment the rotation phases agree with each other. However, an operator cannot recognize the moment of the agreement of the rotation phases, and cannot operate the gear shifting manipulator just at the moment of the agreement of the rotation phases.

Therefore, the operation of the gear shifting manipulator may be stopped on the way of its stroke because the flat end surfaces of the clutch teeth, whose rotation phases do not agree, abut against each other. In such a case, an operator may apply excessive force so as to squeeze the clutch teeth into the tooth spaces. When such an excessive force is applied, the clutch teeth may engage with each other suddenly just at the moment of the agreement of the rotation phases, so as to generate such a big shock as to damage the drive system.

SUMMARY OF THE INVENTION

An object of the present invention is to provide a gear shifting mechanism of an axle drive system, which prevents the shocking flipping of the clutch teeth while the rotation phases of the clutch teeth do not agree with each other, and which can automatically complete the engagement of the clutch teeth at the moment the rotation phases of the clutch teeth comes to agree with each other.

To achieve the object, according to the present invention, a gear shifting mechanism of an axle drive system comprises: a shaft drivingly connected to an axle; a first clutch gear relatively rotatably provided on the shaft, the first clutch gear having first clutch teeth; a second clutch gear relatively rotatably provided on the shaft, the second clutch gear having second clutch teeth; a spline hub fixed on the shaft between the first and second clutch gears; a gear shifting slider axially slidably and not relatively rotatably fitted on the spline hub, the gear shifting slider having third clutch teeth; slider-shift means integrally movably interlocking with the gear shifting slider; operation means operatively interposed between the slider-shift means and a gear shifting manipulator; and elastic means interposed between the slider-shift means and the operation means.

End surfaces of the first, second and third clutch teeth facing one another are flat. The gear shifting slider can be shifted among a neutral position, a first stage position and a second stage position. When the gear shifting slider is disposed at the neutral position, the third clutch teeth engages with none of the first and second clutch teeth. When the gear shifting slider is disposed at the first stage position, the third clutch teeth engages with not the second clutch teeth but the first clutch teeth. When the gear shifting slider is disposed at the second stage position, the third clutch teeth engages with not the first clutch teeth but the second clutch teeth.

The operation means can be shifted among a neutral setting position for setting the gear shifting slider at the neutral position, a first stage setting position for setting the gear shifting slider at the first stage position, and a second stage setting position for setting the gear shifting slider at the second stage position. The slider-shift means can be movable relative to the operation means to some degree so as to be delayed after shift of the operation means. The elasticity of elastic means allows the movement of the slider-shift means relative to the operation means, and biases the third clutch teeth to engage with either the first or second clutch teeth.

Due to the above gear shifting mechanism, during the shift of the operation means from the neutral setting position to the first or second stage setting position, when the rotation phase of the first or second clutch teeth does not agree with that of the third clutch teeth (i.e., the spline hub), the flat end surface of the third clutch teeth abut against the flat end surface of the first or second clutch teeth, so that the third clutch teeth are prevented from entering tooth spaces of the first or second clutch teeth, thereby preventing the flipping of clutch teeth.

At the moment the rotation phases come to agree with each other, the gear shifting slider is automatically moved to the first or second stage position by biasing force of the elastic means.

Due to the relative movement of the slider-shift means and the operation means allowed by the elastic means; abrasion of the abutting part between the gear shifting slider and the slider-shift means (such as a shifter pawl) can be reduced.

Preferably, the slider-shift means includes a casing through which a part of the operation means is relatively movably passed. The elastic means is disposed in the casing so as to be interposed between the slider-shift means and the operation means.

Accordingly, the casing protects the elastic means therein from collision with other members, and secures reliability of elastic action of the elastic means.

Alternatively, preferably, the gear shifting mechanism further comprises a casing incorporating the shaft, the first clutch gear, the second clutch gear, the spline hub, the gear shifting slider, and a shifter. The elastic means is disposed out of the casing so as to be interposed between the slider-shift means and the operation means.

Accordingly, a reaction force of the elastic means disposed out of the casing can be easily adjusted. Therefore, dispersions of shift feeling among individual axle drive systems can be reduced.

Preferably, the movable range of the slider-shift means relative to the operation means and gaps among the first, second and third clutch teeth are set so as to enable the gear shifting slider to be completely shifted from the neutral position to the first or second stage position after the operation means is completely shifted from the neutral setting position to the first or second stage setting position.

Due to such early completion of the shift of the operation means (i.e., the delay of the shift of the slider-shift means and the gear shifting slider after the operation means), an operator manipulating the operation means can be prevented from the shock caused when the rotation phases comes to agree and the third clutch teeth enter the tooth spaces of the first or second clutch teeth.

Preferably, the movable range of the slider-shift means relative to the operation means and depths of engagement of the third clutch teeth into the first and second clutch teeth are set so as to enable the third clutch teeth to be removed from the first or second clutch teeth before the operation means is completely shifted from the first or second stage setting position to the neutral setting position.

Due to the removal of the third clutch teeth from the first or second clutch teeth prior to the shift of the operation means, not only the biasing force of the elastic means but also the manipulation force applied onto the operation means can be applied onto the slider-shift means and the gear shifting slider so as to ensure the removal.

Preferably, bottoms of tooth spaces of the spline hub are upwardly sloped toward a center portion thereof so that end sides thereof facing to the clutch teeth of the first and second clutch gears are deeper than the center portion.

Accordingly, even if the third clutch teeth engaging with either the first or second clutch teeth receives a thrust force toward the spline hub, the upward slopes of the bottoms of the tooth spaces of the spline hub prevent the third clutch teeth from further entering the tooth spaces of the spline hub, thereby keeping the engagement of the third clutch teeth with either the first or second clutch teeth.

Preferably, after the slider-shift means moved by the elasticity of the elastic means reaches a limit position thereof relative to the operation means, the slider-shift means is held at the limit position relative to the operation means during the shift of the operation means.

Accordingly, even if a very large force is required to shift the gear shifting slider to the neutral position, e.g., in such a state that the input side of the gear shifting mechanism receives an inertial rotation torque from a belt transmission or an HST on the upstream of the gear shifting mechanism while the axle is braked, the large manipulation force to shift the operation means is surely transmitted to the gear shifting slider until the third clutch teeth are removed from the first or second clutch teeth.

These, other and further objects, features and effects will appear more fully from the following description with reference to accompanying drawings.

BRIEF DESCRIPTION OF THE DRAWINGS

FIG. 13(*b*) illustrates shapes of clutch teeth of the prior art gear shifting slider and first and second clutch gears with the chamfers.

DETAILED DESCRIPTION OF THE INVENTION

Figure 1:
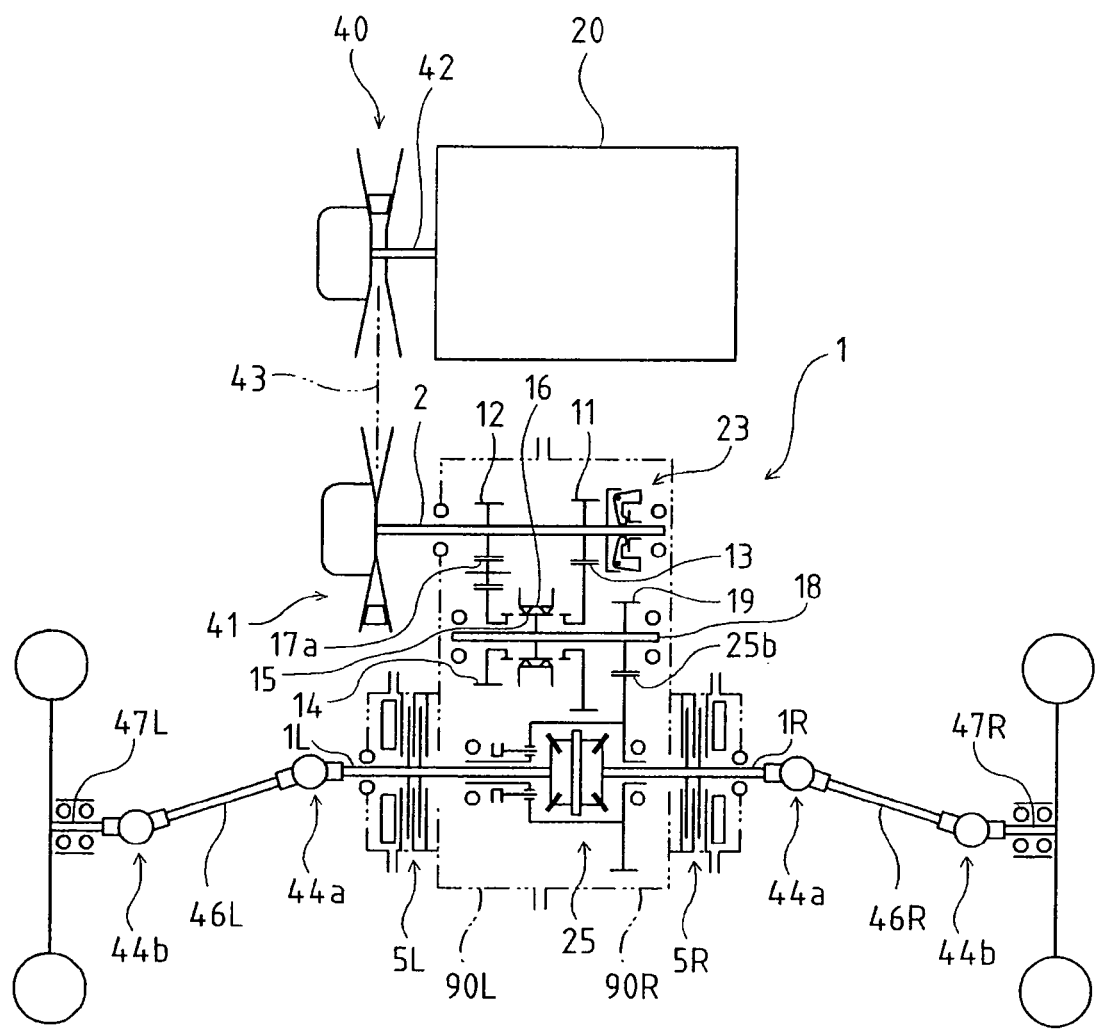
FIG. 1 is a diagram of an axle drive system disposed in a power train from a prime mover to axles.

FIG. 1 illustrates an axle drive system 1 from an output shaft 42 of a prime mover 20 to axles 47L and 47R. The axle drive system 1 has a transmission casings 90L and 90R. Output shafts 1L and 1R projecting outward from the respective transmission casings 90L and 90R are connected to the respective axles 47L and 47R through transmission shafts 46L and 46R and universal joints 44*a* and 44*b*.

An output pulley 40 is fixed on the output shaft 42 of the prime mover 20, and an input pulley 41 is fixed on an input shaft 2 of the axle drive system 1. Power is transmitted from the output pulley 40 to the input pulley 41 through a V belt 43. Both of the pulleys 40 and 41 are split pulleys, whose diameters are changed to correspond to rotation speed of the prime mover 20 so as to steplessly change the rotation speed ratio of the input shaft 2 to the output shaft 42.

Figure 2:
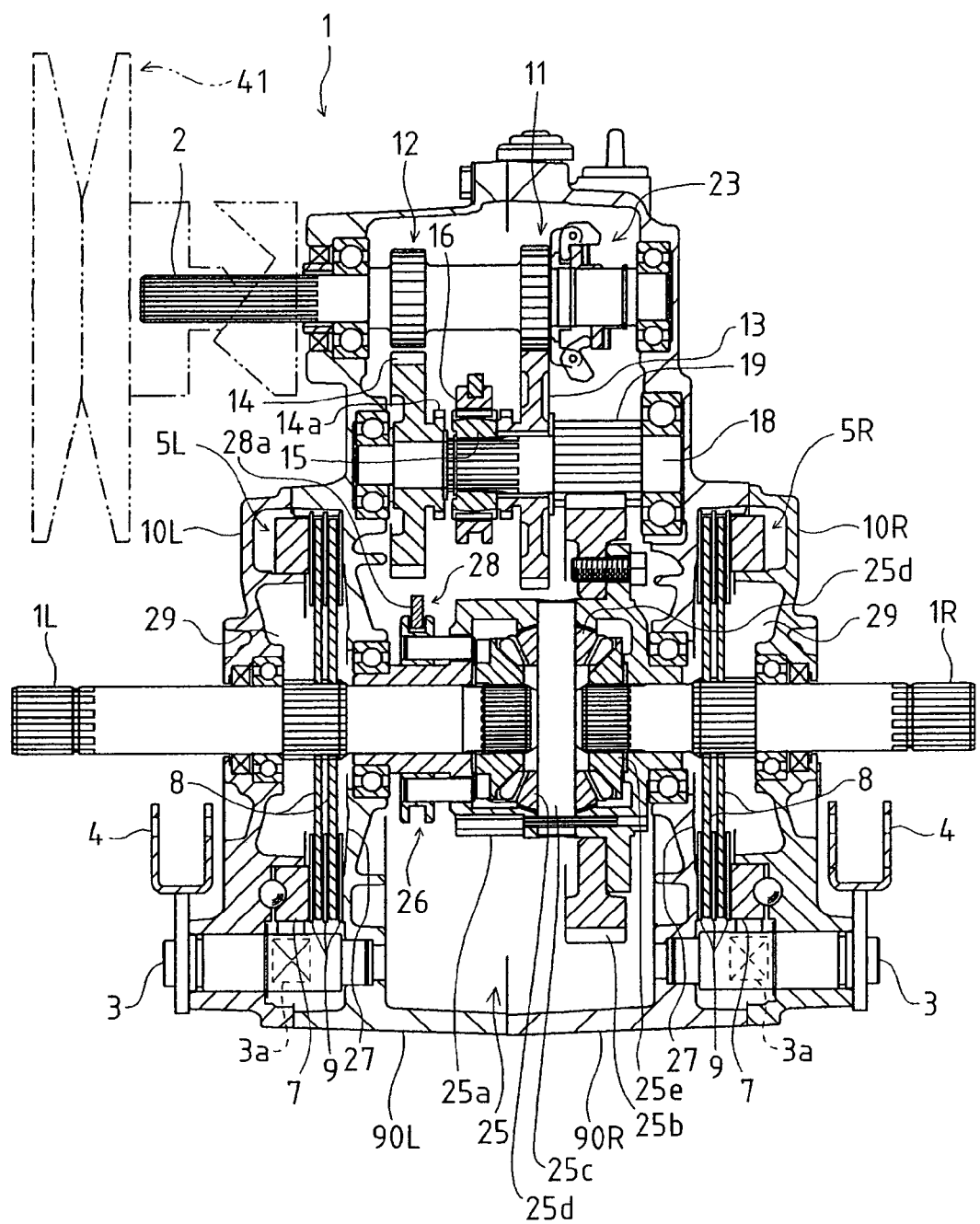
FIG. 2 is a sectional rear view of the axle drive system, from which slider-shift means, elastic means and operation means of a gear shifting mechanism are removed.
Figure 3:
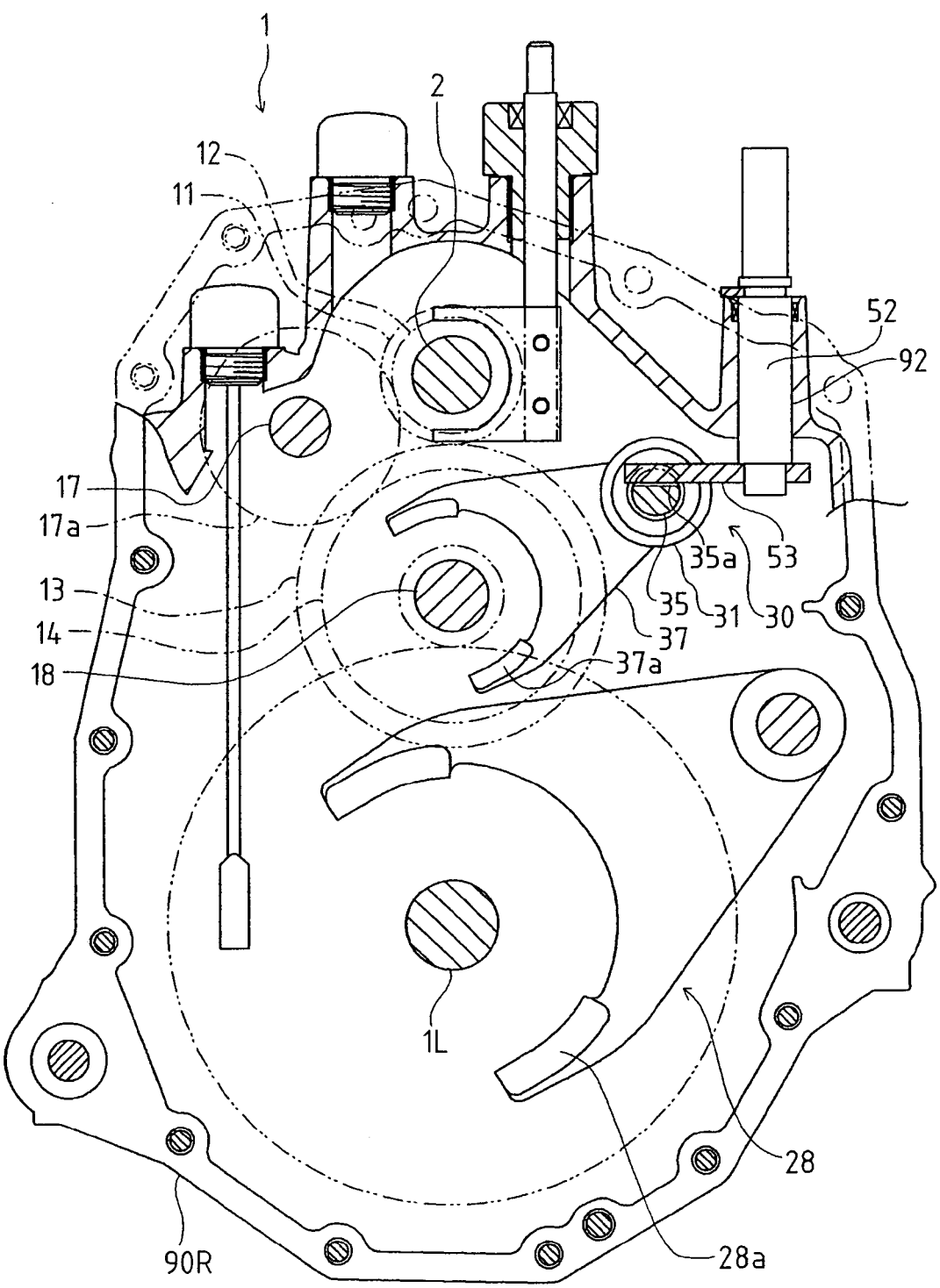
FIG. 3 is a schematic sectional right side view of the axle drive system.
Figure 4:
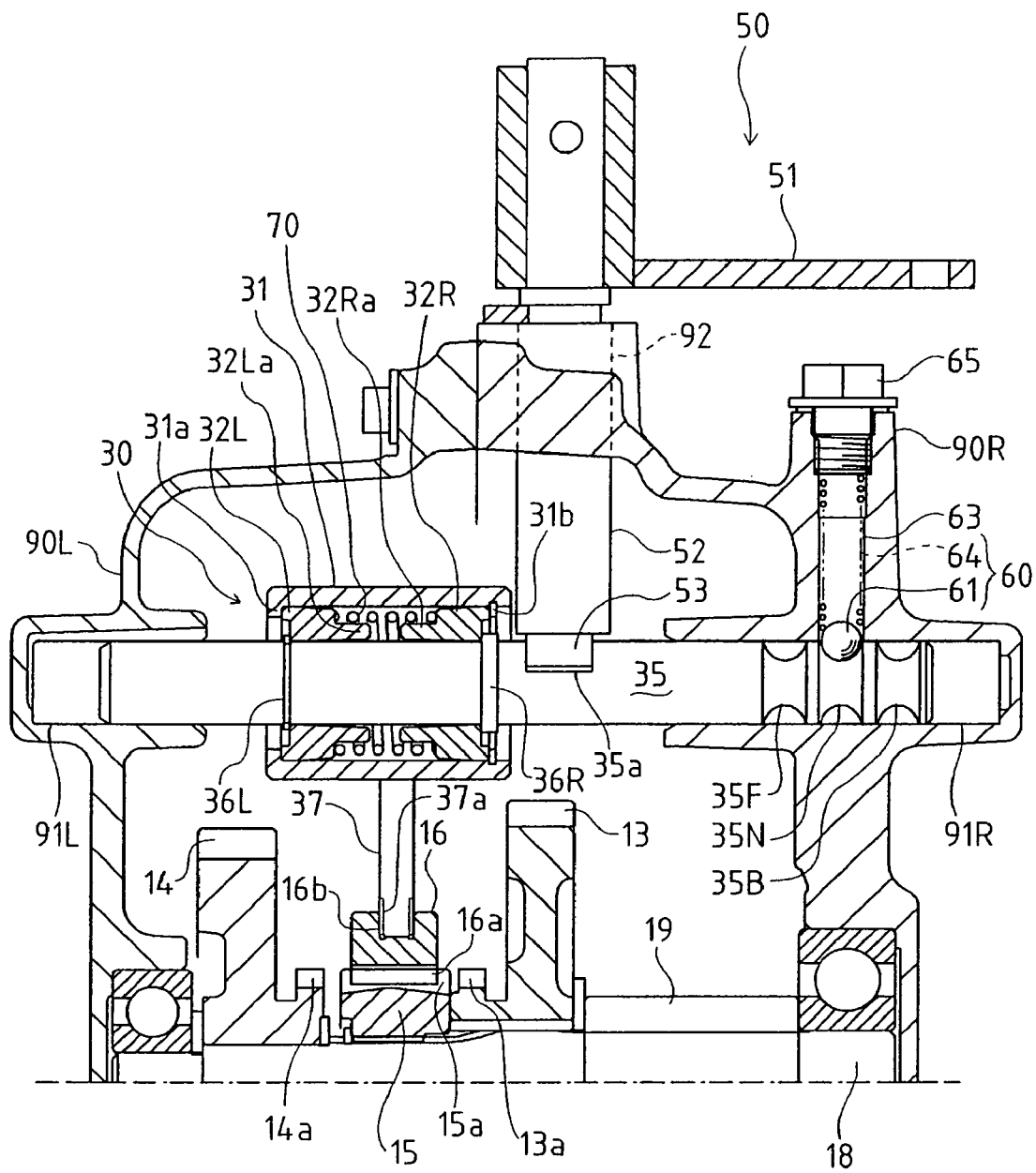
FIG. 4 is a rear view partly in section of a gear shifting mechanism according to a first embodiment of the present invention, showing operation means at a neutral setting position and a gear shifting slider at a neutral position.

As shown in FIGS. 2 to 4, the input shaft 2 is inserted into the transmission casings 90L and 90R so as to be supported pivotally.

In the joined transmission casings 90L and 90R, a forward traveling drive gear 11 and a backward traveling drive gear 12 are notched on the input shaft 2, and a governor mechanism 23 is disposed on an end of the input shaft 2 adjacent to the forward traveling drive gear 11.

In the transmission casings 90L and 90R, a clutch shaft 18 is pivotally supported in parallel to the input shaft 2. A forward traveling clutch gear 13 engaging with the forward traveling drive gear 11 is relatively rotatably fitted on the clutch shaft 18. A backward traveling clutch gear 14 is also relatively rotatably fitted on the clutch shaft 18 and engages with the backward traveling drive gear 12 through an intermediate gear 17*a* freely rotatably fitted on an intermediate shaft 17 (shown in FIG. 3) disposed in parallel to the clutch shaft 18.

A spline hub 15 is fixed on the clutch shaft 18 between the forward traveling clutch gear 13 and the backward traveling clutch gear 14. The spline hub 15 is formed with splines 15*a* on its outer periphery. The forward traveling clutch gear 13 is formed with clutch teeth 13*a* toothed corresponding to the splines 15*a* on one (left) end portion thereof facing the spline hub 15. The backward traveling clutch gear 14 is formed with clutch teeth 14*a* toothed corresponding to the splines 15*a* on one (right) end portion thereof facing the spline hub 15.

A gear shifting slider 16 is formed on its inner periphery with clutch teeth 16*a*, which constantly engages with the splines 15*a*, so as to be slidably and not relatively rotatably fitted on the spline hub 15 between the clutch teeth 13*a* and 14*a*. The gear shifting slider 16 is axially moved along the clutch shaft 18 and shifted among a neutral position, a forward traveling position (a first stage position), and a backward traveling position (a second stage position).

When the gear shifting slider 16 is disposed at the forward traveling position, the clutch teeth 16*a* constantly engaging with the splines 15*a* also engage with not the clutch teeth 14*a* but the clutch teeth 13*a* so as to connect the forward traveling clutch gear 13 to the spline hub 15, thereby driving the output shafts 1L and 1R forward.

When the gear shifting slider 16 is disposed at the backward traveling position, the clutch teeth 16*a* constantly engaging with the splines 15*a* also engage with not the clutch teeth 13*a* but the clutch teeth 14*a* so as to connect the backward traveling clutch gear 14 to the spline hub 15, thereby driving the output shafts 1L and 1R backward.

When the gear shifting slider 16 is disposed at the neutral position, the clutch teeth 16*a* engages with neither the clutch teeth 13*a* nor the clutch teeth 14*a*, but with only the sp lines 15*a* of the spline hub 15, and the axle drive system 1 is in a neutral state where driving power is not outputted to the output shafts 1L and 1R.

As shown in FIG. 2, an intermediate output gear 19 is notched on one of ends of the clutch shaft 18 adjacent to the forward traveling clutch gear 13.

As shown in FIG. 2, the output shafts 1L and 1R are pivotally supported in parallel to the input shaft 2 by the respective transmission casings 90L and 90R. Both of the output shafts 1L and 1R are differentially connected with each other in the transmission casings 90L and 90R by a differential mechanism 25.

The differential mechanism 25 comprises: a differential casing 25*a* pivotally supported by the transmission casing 90R; a bull gear 25*b* fixed on the differential casing 25*a* and engaging with the intermediate output gear 19; a pinion shaft 25*c* fitted inside the differential casing 25*a* perpendicular to the output shafts 1L and 1R, pinions 25*d* rotatably supported by the pinion shaft 25*c*; and side gears 25*e* engaging with the pinions 25*d* and fixed onto proximal ends of the output shafts 1L and 1R.

The differential mechanism 25 is provided with a differential lock slider 26. By operating a differential lock shifter 28 (whose shifter pawl 28*a* is fitted into the differential lock slider 26 as shown in FIG. 2), the differential mechanism 25 is locked so as to rotate the output shafts 1L and 1R integrally.

As shown in FIG. 2, the transmission casings 90L and 90R are formed with respective laterally outwardly open recesses 27 coaxial to the output shafts 1L and 1R. Brake devices 5L and SR are disposed in the respective recesses 27.

The brake devices 5L and SR housed in the recesses 27 are covered by respective covers 10L and 10R. Each of the brake devices 5L and SR comprises: friction disks 8 slidably and not relatively rotatably fitted to each of the output shafts 1L and 1R; friction disks 9 slidably and not relatively rotatably fitted to each of the transmission casings 90L and 90R; an actuator 7 for pressing the friction disks 9 against the friction disks 8; and a brake cam shaft 3 provided with a cam 3*a* for operating the actuator 7.

Brake arms 4 are operated by an unshown parking brake manipulator (such as a lever) provided near a driver's seat of a vehicle so as to rotate the left and right brake cam shafts 3, thereby simultaneously operating the left and right brake devices 5L and SR for braking.

Next, explanation will be given of a gear shifting mechanism shown in FIGS. 3 to 7 according to a first embodiment. For example, the gear shifting mechanism is provided on the downstream of a belt type automatic stepless transmission 41, as shown in FIG. 2. The gear shifting mechanism comprises first and second clutch gears to be selectively engaged with the spline hub 15 fixed on the clutch shaft 18 through the gear shifting slider 16. In this embodiment, the first and second clutch gears are the forward traveling clutch gear 13 and the backward traveling clutch gear 14 for selecting one of forward and backward rotary directions of the output shafts 1L and 1R (axles 47L and 47R). Alternatively, the first and second clutch gear may be gears for selecting one of low and high rotary speed levels of axles.

The gear shifting mechanism further comprises slider-shift means 30 and operation means 50. The slider-shift means 30 interlocks with the gear shifting slider 16 so as to be axially movable integrally with the gear shifting slider 16. The operation means 50 is connected to the slider-shift means 30, and operatively connected to a gear shifting manipulator (lever) so as to shift the gear shifting slider 16 among the above three positions. The slider-shift means 30 is movable relative to the operation means 50 to some degree, and later-discussed elastic means absorbs the relative movement of the slider-shift means 30 relative to the operation means 50.

Both end surfaces of the clutch teeth 16a of the gear shifting slider 16, an end surface of the clutch teeth 13a of the forward traveling clutch gear 13 facing to one of the end surfaces of the clutch teeth 16a, and an end surface of the clutch teeth 14a of the backward traveling clutch gear 14 facing to the other end surface of the clutch teeth 16a are formed to be flat perpendicular to the rotation axis of the gears 13 and 14.

Figure 13:
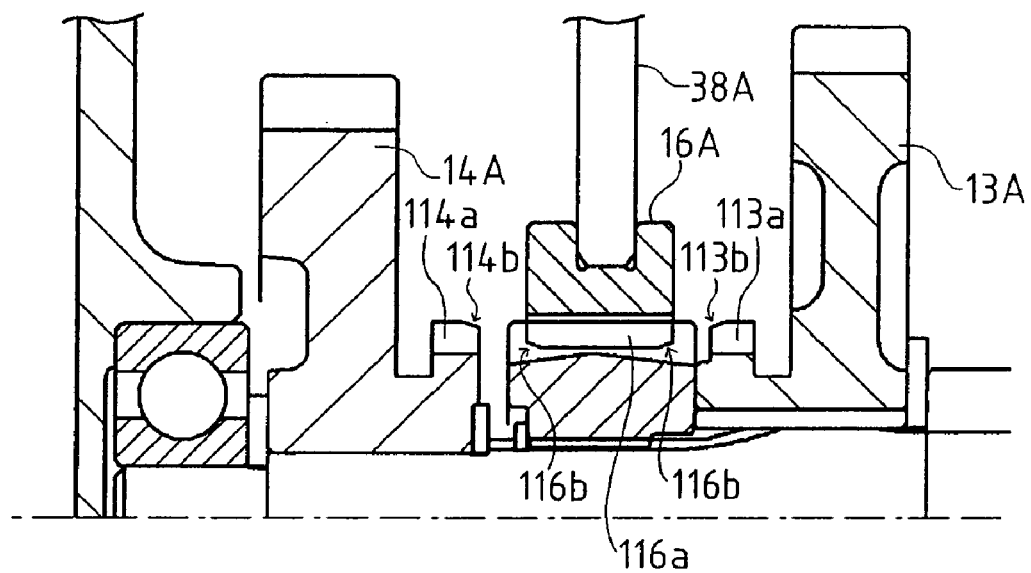
FIG. 13(*a*) is a sectional rear view of prior art gear shifting slider and first and second clutch gears, whose clutch teeth are formed with chamfers.
Figure 13:
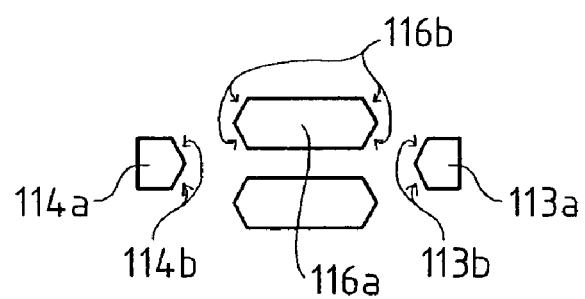

Each of the flat end surfaces of the clutch teeth 16a, 13a and 14a has corner edges, as shown in FIG. 4, far from having chamfers such as the above-mentioned chamfers 113b, 114b and 116b formed on clutch teeth 113a, 114a and 116a shown in FIG. 13.

Due to such shapes of the clutch teeth 13a, 14a and 16a, by operating the operation means 50 from its neutral setting position to its backward traveling setting position (or to its forward traveling setting position), the flat end surfaces of the clutch teeth 14a (or 13a) and 16a abut against each other. However, the entrance of clutch teeth 16a into tooth spaces of the clutch teeth 14a (or 13a) causing the flipping between the clutch teeth 14a (or 13a) and 16a is prevented before the rotation phase of the clutch teeth 14a (or 13a) comes to agree with that of the clutch teeth 16a.

When the clutch teeth 16a is prevented from entering the tooth spaces of the clutch teeth 14a (or 13a) as the above mentioned, the manipulation for gear shifting is suspended. In this situation, an operator may apply an excessively large force on the gear shifting slider 16 so as to squeeze the clutch teeth 16a into the tooth spaces of the clutch teeth 14a (or 13a). However, both of the clutch teeth 14a (or 13a) and 16a continuously rotate relative to each other in spite of the large manipulation force, and, just at the moment the rotation phases thereof come to agree with each other, the clutch teeth 14a (or 13a) and 16a suddenly engage with each other so as to shock the operator.

However, the present gear shifting mechanism further comprises a spring 70 (an example of elastic means) interposed between the slider-shift means 30 and the operation means 50 so as to allow a delay of the slider-shift means 30 after the operation means 50. While the slider-shift means 30 is delayed, the spring 70 is compressed so as to bias the clutch teeth 16a of the gear shifting slider 16 toward either the clutch teeth 13a of the first clutch gear 13 or the clutch teeth 14a of the second clutch gear 14.

Due to the spring 70, the manipulation to shift the operation means 50 is continued till its end while the slider-shift means 30 is delayed because the flat end surfaces of the clutch teeth 14a (or 13a) and 16a abut against each other. After the manipulation is completed, and when the rotation phases of the clutch teeth 14a (or 13a) and 16a come to agree with each other, the engagement of the gear shifting slider 16 with the gear 14 (or 13) is automatically completed moderately by the biasing force of the spring 70.

Figure 5:
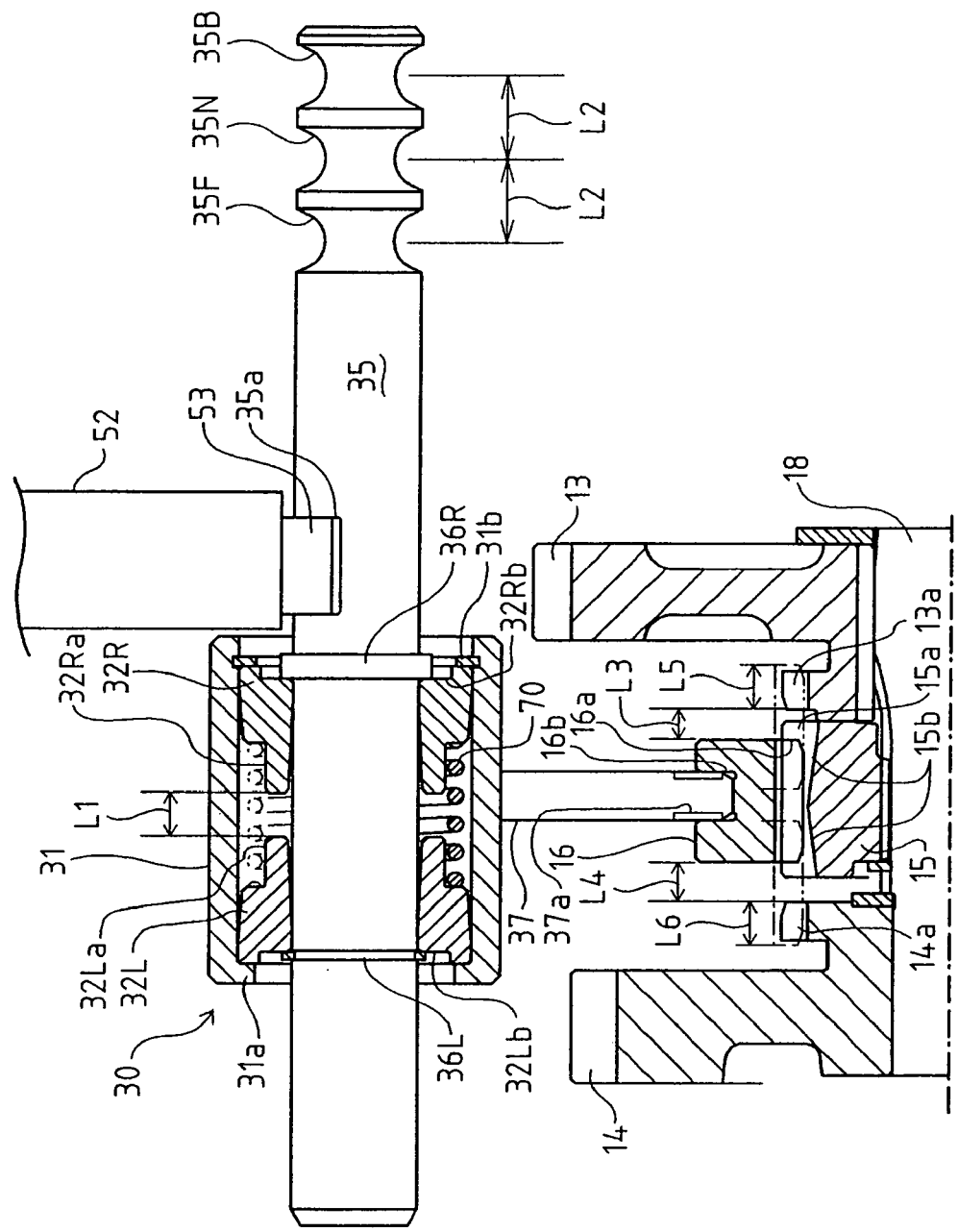
FIG. 5 is a sectional rear view of a principal portion of the gear shifting mechanism.

As shown in FIG. 5, the operation means 50 comprises a shifter shaft 35 disposed in parallel to the clutch shaft 18. The slider-shift means 30 comprises a shifter casing 31 provided on the shifter shaft 35, and a shifter fork 37 fixedly projecting from the shifter casing 31. The shifter shaft 35 is axially movably supported at opposite end portions thereof by the left and right transmission casings 90L and 90R, as shown in FIG. 4. In this regard, the transmission casings 90L and 90R have respective opposite horizontal coaxial recesses 91L and 91R, into which opposite ends of the shifter shaft 35 is slidably fitted. The axial movement of the shifter shaft 35 is transmitted through the spring 70 and the slider-shift means 30 to the gear shifting slider 16 so as to shift the gear shifting slider 16 among the above three positions.

The shifter fork 37 has a shifter pawl 37a fitted into a peripheral groove 16b of the gear shifting slider 16. The output shafts 1L and 1R receive load from a ground surface, and the load is changed as a state of the ground surface changes. Especially, during traveling on a wet ground, the load becomes so large as to apply a thrust force to the gear shifting slider 16 toward the neutral position through the gear 13 or 14 engaging with the gear shifting slider 16. If the splines 15a of the spline hub 15 were simply shaped into level grooves, the gear shifting slider 16 would easily remove from the forward or backward traveling position to the neutral position. The shifter pawl 37a resists the removing movement of the gear shifting slider 16, so that contact pressure between the shifter pawl 37a and the groove 16b becomes large, thereby causing unusual abrasion.

In the present embodiment, the tooth spaces of the splines 15a of the spline hub 15 have sloped bottoms 15b. The bottoms 15b are shallow at their center portions thereof, on which the clutch teeth 16a of the gear shifting slider 16 is disposed when the gear shifting slider 16 is in the neutral position. The bottoms 15b become deeper and deeper as going toward their opposite ends facing the forward traveling clutch gear 13 and the backward traveling clutch gear 14.

When the gear shifting slider 16 moves to the neutral position away from the gear 13 or 14 engaging with it, the clutch teeth 16a among the splines 15a must slide on the upward slope of the bottoms 15b. Therefore, the clutch teeth 16a are hard to reach the center portion of the bottoms 15b to the neutral position, i.e., the gear shifting slider 16 is hard to escape from the gear 13 or 14 engaging with it.

The cylindrical shifter casing 31 is supported on the shifter shaft 35 through a pair of collars 32L and 32R provided inside the shifter casing 31. The collars 32L and 32R are axially slidable on the shifter shaft 35 in the shifter casing 31. One axial end edge 31a of the shifter casing 31 on the collar 32L side has an opening which is diametrically smaller than the collar 32L, thereby preventing the collar 32L from escaping from the shifter casing 31. A retaining ring 36L is fixed on the shifter shaft 35. An end surface of the collar 32L facing the end edge 31a is formed with an axial recess 32Lb, in which the retaining ring 36L is disposed when it abuts against the collar 32L.

The other axial end edge of the shifter casing 31 on the collar 32R side has an opening which is substantially diametrically as large as the collar 32L so as to facilitate insertion and removal of the collars 32L and 32R and the spring 70 into and from the shifter casing 31. However, the shifter collar 31 is fixedly provided with a retaining ring 31b onto the inner periphery adjacent to the other end thereof, thereby preventing the collar 32R from escaping from the shifter casing 31. A retaining ring 36R is fixed on the shifter shaft 35. An end surface of the collar 32R facing the retaining ring 31b is formed with an axial recess 32Rb, in which the retaining ring 36R is disposed when it abuts against the collar 32R.

The collars 32L and 32R are diametrically stepped at their axial intermediate portions so as to diametrically reduce their mutually facing portions 32La and 32Ra. The coil spring 70 is compressed between the steps of the collars 32L and 32R so as to be wound around the diametrically small portions 32La and 32Ra of the collars 32L and 32R, thereby biasing the collars 32L and 32R away from each other. By the elastic force of the spring 70, the collars 32L and 32R naturally abut at their opposite outer ends against the end edge 31a and the retaining ring 36L, and against the retaining rings 31b and 36R, respectively, so that a predetermined gap L1 (as shown in FIG. 5) is ensured between the mutually facing ends of the collars 32L and 32R.

If the axles 47L and 47R (or one of them) receive large load from the ground surface, a thrust force to move the gear shifting slider 16 is generated, and the shifter fork 37 having the shifter pawl 37a fitted in the groove 16b of the gear shifting slider 16 will move together with the gear shifting slider 16. The spring 70 is elastically compressed so as to allow the shifter casing 31 fixed to the shifter fork 37 to move along the stationary shifter shaft 35, so that one of the collar 32L and 32R is pushed by the shifter casing 31 through the end edge 31a or the retaining ring 31b so as to approach the other collar 32R or 32L, which is retained by the retaining rings 31b and 36R or by the end edge 31a and the retaining ring 36L, i.e., to reduce the gap L1. In this way, the axial movement of the shifter casing 31 together with the gear shifting slider 16 is allowed so as to prevent unexpected abrasive contact pressure between the shifter pawl 37a and the gear shifting slider 16.

On the other hand, the resistance of the spring 70 prevents excessive sliding of the collar 32L or 32R with the shifter casing 31 and the shifter fork 37 along the stationary shifter shaft 35, thereby preventing escape of the gear shifting slider 16 from its proper position set by the axial positioning of the shifter shaft 35.

Incidentally, the shifter casing 31 protects the collars 32L and 32R and the spring 70 therein so as to keep their proper function.

Referring to the operation means 50, as shown in FIGS. 3 and 4, the shifter shaft 35 is notched at an axial intermediate portion thereof so as to form a recess 35a, through which a substantially horizontal shifter arm 53 is passed. A vertical operation shaft 52 is rotatably supported by the transmission casing 90R. In this regard, the transmission casing 90R is formed at its top portion with a vertically penetrating boss hole 92, through which the operation shaft 52 is rotatably passed. The shifter arm 53 is fixed onto a bottom end portion of the operation shaft 52. A horizontal gear shifting operation arm 51 is fixed onto a top end of the operation shaft 52 projecting upward from the transmission casings 90L and 90R. The shifter arm 53 engages with the shifter shaft 35 so as to convert the integral rotation of the operation shaft 52 with the arm 51 to the axial movement of the shifter shaft 35. The gear shifting operation arm 51 is connected through a linkage to an unshown gear shifting manipulator (such as a lever) disposed near a driver's seat of a vehicle.

Due to this construction of the operation means 50, when an operator operates the gear shifting manipulator, the arms 51 and 53 and the shaft 52 are rotated together so that the shifter arm 53 is moved in the recess 35a and pushes the shifter shaft 35, thereby axially moving the shifter shaft 35.

As shown in FIG. 4, detent means 60 is provided within a wall of the transmission casing 90R, and the portion of the shifter shaft 35 fitted in the recess 91R is formed in correspondence to the detent means 60.

Referring to the detent means 60, a vertical guide hole 63 is formed within the wall of the transmission casing 90R. The guide hole 63 is open upwardly outward from the transmission casing 90R, and open downward into the recess 91R. In the guide hole 63 are disposed a spring 64 and a ball 61 biased toward the shifter shaft 35 in the recess 91R by the spring 64. The portion of the shifter shaft 35 in the recess 91R is formed with aligned peripheral detent grooves 35F, 35N and 35B. The ball 61 biased by the spring 64 is selectively engaged into one of the detent grooves 35F, 35N and 35B so as to detent the shifter shaft 35 at one of its three axial shift positions, i.e., a forward traveling setting position, a neutral setting position and a backward traveling setting position. The upper opening of the guide hole 63 is closed by a plug 65 so that the spring 64 is compressed between the ball 61 and the plug 65.

Figure 7:
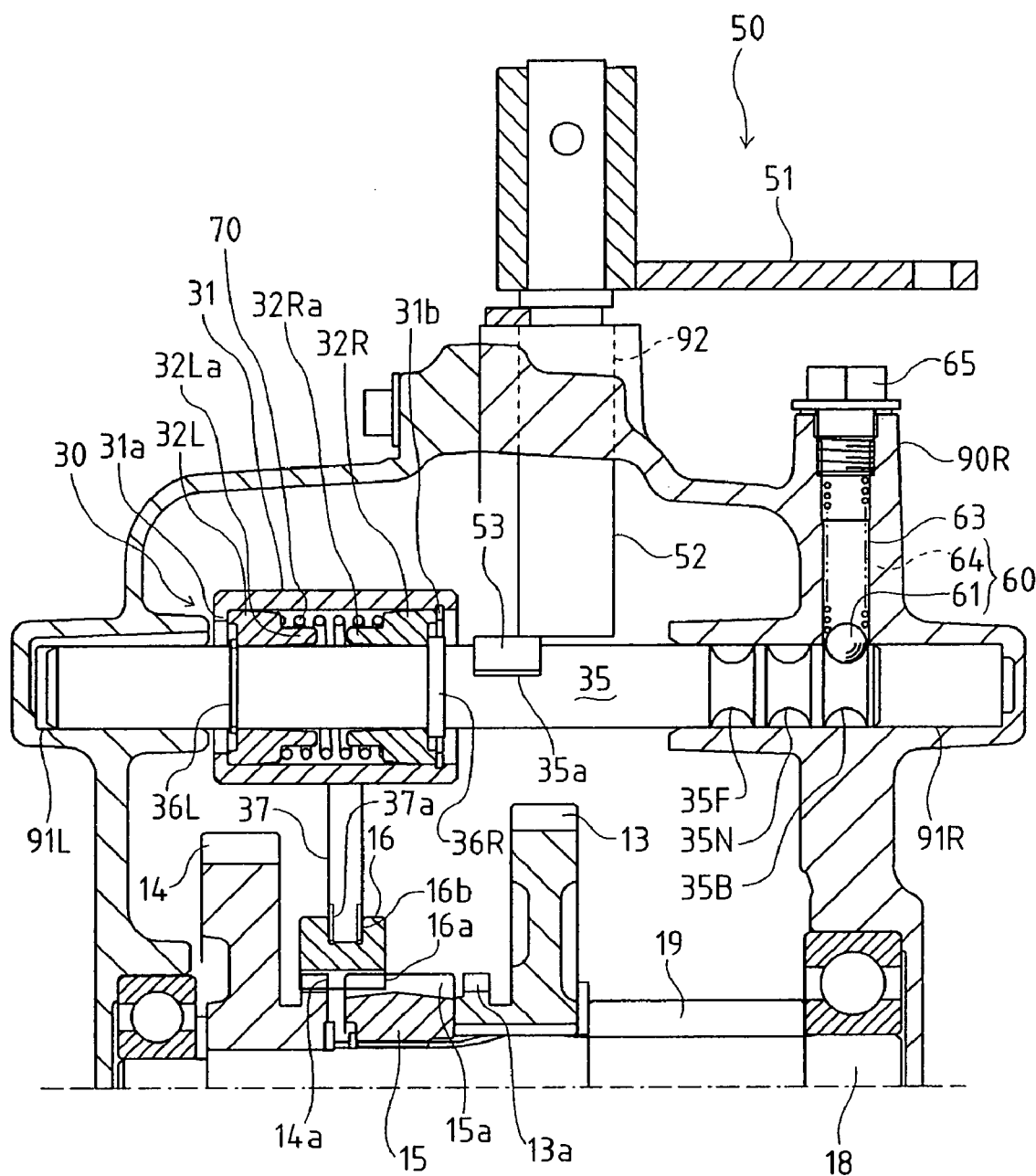
FIG. 7 is a sectional rear view of the gear shifting mechanism, showing the gear shifting slider reaching a backward traveling position.

The shifter shaft 35 is set (and held) at the forward traveling setting position to set the gear shifting slider 16 at the forward traveling position, where the clutch teeth 16a engage with the spines 15a and the clutch teeth 13a so as to drivingly connect the forward traveling clutch gear 13 to the clutch shaft 18. The shifter shaft 35 is set (and held) at the neutral setting position to set the gear shifting slider 16 at the neutral position, where the clutch teeth 16a engage with only the splines 15a, as shown in FIG. 4, so as to drivingly separate both the clutch gears 13 and 14 from the clutch shaft 18. The shifter shaft 35 is set (and held) at the backward traveling setting position to set the gear shifting slider 16 at the backward traveling position, where the clutch teeth 16a engage with the spines 15a and the clutch teeth 14a, as shown in FIG. 7, so as to drivingly connect the backward traveling clutch gear 14 to the clutch shaft 18.

As shown in FIG. 5, a pitch L2 between bottoms of the grooves 35F and 35N is as large as a pitch L2 between bottoms of the grooves 35N and 35B, and the pitch L2 is longer than the gap L1 between the collars 32L and 32R.

It is assumed hereinafter that the forward traveling clutch gear 13 is disposed on the right side of the spline hub 15, and the backward traveling clutch gear 14 on the left side of the spline hub 15, as show in FIG. 4.

When the gear shifting slider 16 is disposed at its neutral position, a gap L3 is generated between a right end surface of the clutch teeth 16a and a left end surface of the clutch teeth 13a. The pitch L2 is longer than the gap L3 and shorter than a total of the gaps L3 and L1. Similarly, when the gear shifting slider 16 is disposed at the neutral position, a gap L4 is generated between a left end surface of the clutch teeth 16a and a right end surface of the clutch teeth 14a. The pitch L2 is longer than the gap L4 and shorter than a total of the gaps L4 and L1. Such a dimension setting is referred to as a first dimension setting.

According to the first dimension setting, the gear shifting manipulation to shift the shifter shaft 35 from the neutral setting position to either the forward traveling setting position or the backward traveling setting position can be finished before completion of the gear shifting, i.e., the setting of the gear shifting slider 16 to its forward or backward traveling position, as discussed later.

When the gear shifting slider 16 is disposed at its forward traveling position, the clutch teeth 16a and 13a engage with each other so as to have an engagement depth L5, i.e., an interval between the right end surface of the clutch teeth 16a and the left end surface of the clutch teeth 13a. A total of the engagement depth L5 and the gap L1 is shorter than the pitch L2. Similarly, when the gear shifting slider 16 is disposed at its backward traveling position, the clutch teeth 16a and 14a engage with each other so as to have an engagement depth L6, i.e., an interval between the left end surface of the clutch teeth 16a and the right end surface of the clutch teeth 14a. A total of the engagement depth L6 and the gap L1 is shorter than the pitch L2. Such a dimension setting is referred to as a second dimension setting.

According to the second dimension setting, when an operator manipulates to shift the shifter shaft 35 from either the forward traveling setting position or the backward traveling setting position to the neutral setting position, the gear shifting slider 16 is surely removed from the forward or backward clutch gear 13 or 14 and reaches its neutral position, as discussed later.

Explanation will be given of a process to shift the gear shifting slider 16 from the neutral position to the backward traveling position by using the above-mentioned gear shifting mechanism according to the first embodiment.

Figure 6:
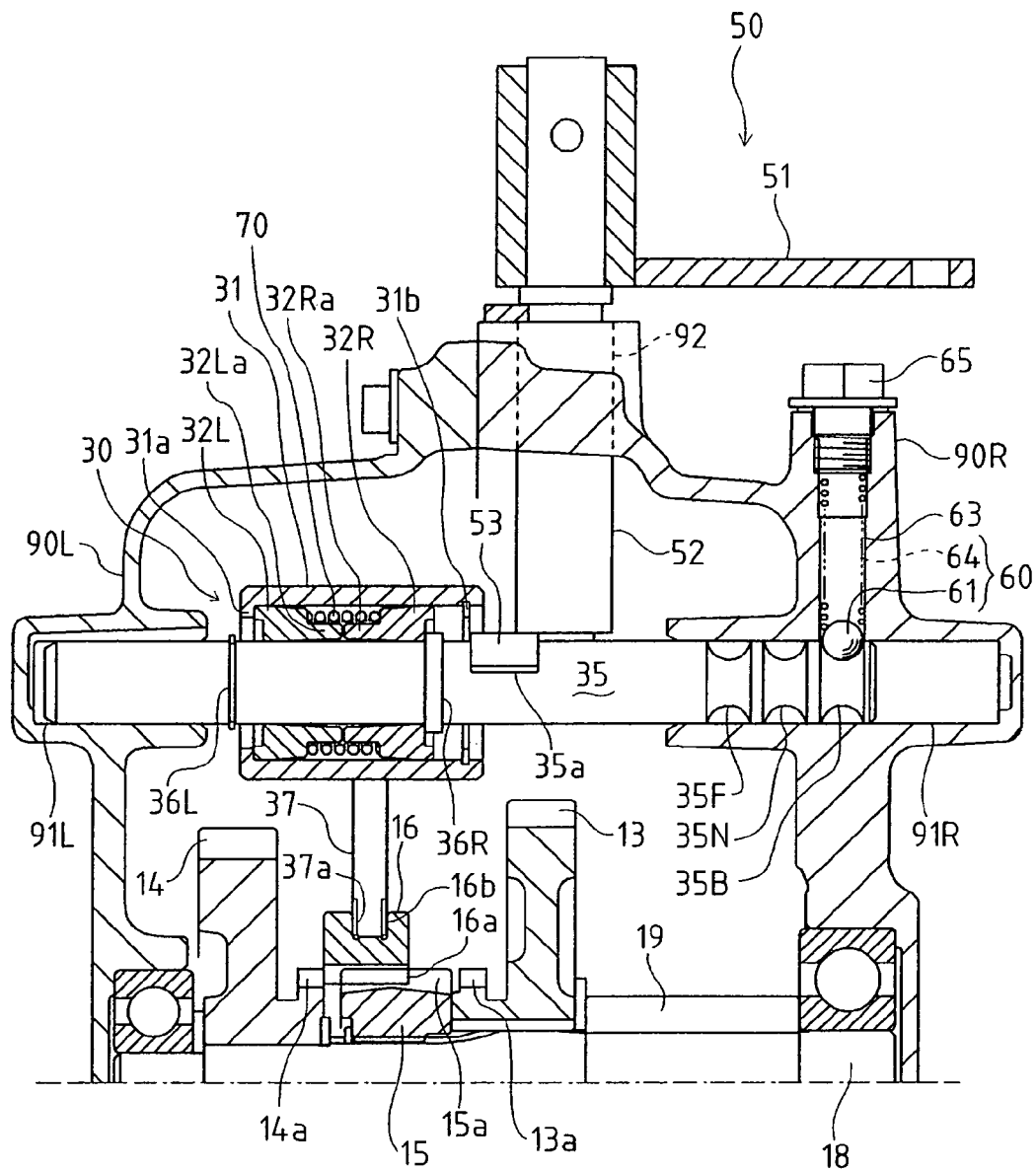
FIG. 6 is a sectional rear view of the gear shifting mechanism, showing the gear shifting slider remaining at a gear abutting position after the operation means reaches a backward traveling setting position.

As shown in FIGS. 4 and 6, the gear shifting operation arm 51 is rotated together with the operation shaft 52 and the shifter arm 53 so as to slide the shifter shaft 35 leftward from its neutral setting position to its backward traveling setting position. The axial movement length of the shifter shaft 35 between the neutral setting position and the backward traveling setting position corresponds to the pitch L2. When the ball moved from the groove 35N (shown in FIG. 4) is completely fitted into the groove 35B (shown in FIG. 6), the shifter shaft 35 reaches the backward traveling setting position, whereby the gear shifting manipulation to shift the shifter shaft 35 by using the manipulator is completed.

While the shifter shaft 35 moves leftward between the neutral setting position and the backward traveling setting position, the retaining ring 36R fixed on the shifter shaft 35 pushes the collar 32R leftward toward the collar 32L so as to reduce the gap L1. The spring 70 is compressed so as to allow the movement of the collar 32R approaching the collar 32L. The collar 32L and the shifter casing 31 pushed by the collar 32L also move leftward because of the biasing force of the spring 70 or the collar 32R abutting against the collar 32L.

Due to the gap L1 between the collars 32L and 32R and the compression of the spring 70, the leftward movement of the collar 32L and the shifter casing 31 can be delayed. The delay means that, at the moment the shifter shaft 35 reaches the backward traveling setting position (where the ball 61 is fitted in the groove 35B), the gear shifting slider 16 engaging with the shifter casing 31 does not reach its backward traveling position yet, i.e., the clutch teeth 16a does not completely engage with the clutch teeth 14a, as shown in FIG. 6.

The delay of the movement of the shifter casing 31 and the gear shifting slider 16 is advantageous for preventing the clutch teeth 16a from entering the tooth spaces of the clutch teeth 14a unless the rotation phase of the splines 15a of the spline hub 15 agrees with that of the clutch teeth 14a of the gear 14. In this state, the mutually facing flat end surfaces (having no conventional chamfers) of the backward traveling clutch gear 14 and the spline hub 15 rotate at different phases so that the clutch teeth 16a engaging with the splines 15a are prevented from entering the tooth spaces of the clutch teeth 14a.

As soon as the rotation phases of the splines 15a and the clutch teeth 14a agree with each other, i.e., the tooth spaces of the splines 15a are opened to the respective tooth spaces of the clutch teeth 14a, the clutch teeth 16a of the gear shifting slider 16, which is biased toward its backward traveling position by the spring 70, enter the tooth spaces of the clutch teeth 14a. Finally, the collar 32L pushing the shifter casing 31 (the end edge 31a) comes to abut against the retaining ring 36L, whereby the gear shifting slider 16 reaches its backward traveling position, where the clutch teeth 16a completely engages with the clutch teeth 14a, as shown in FIG. 7.

Due to the above-mentioned first dimension setting, the pitch L2 is longer than the gap L4 and shorter than the total of the gaps L4 and L1. This dimension setting has the effect of completion of the shift of the shifter shaft 35 from the neutral setting position to the backward traveling setting position prior to the shift of the gear shifting slider 16 from the neutral position to the backward traveling position.

In this regard, the gear shifting slider 16 moves to cover the gap L4 so as to abut at its flat end surface against the flat end surface of the backward traveling clutch gear 14, as shown in FIG. 6. While the gear shifting slider 16 is disposed at a gear abutting position where the flat end surfaces of the slider 16 and gear 14 abut against each other, the shifter shaft 35 moved from the neutral setting position can reach the backward traveling setting position because the pitch L2 is longer than the gap L4. Considering the elasticity of the spring 70, the maximum possible length of movement of the shifter casing 31 to move the gear shifting slider 16 from the gear abutting position corresponds to the gap L1. Since the total of the gaps L1 and L4 is longer than the pitch L2, the gear shifting slider 16 can reach the proper backward traveling position for completely engaging with the backward traveling clutch gear 14 after the shifter shaft 35 reaches the backward traveling setting position.

The above-mentioned function and effect of the gear shifting mechanism are the same in the case of the gear shifting operation of shifting the shifter shaft 35 from the neutral setting position to the forward traveling setting position for shifting the gear shifting slider 16 from the neutral position to the forward traveling position.

By the gear shifting manipulation to shift the shifter shaft 35 from the backward traveling setting position to the neutral setting position, the retaining ring 36L fixed on the shifter shaft 35 pushes the collar 32L in the shifter casing 31 rightward so as to reduce the gap L1. The spring 70 is compressed so as to allow the movement of the collar 32L approaching the collar 32R. The collar 32R and the shifter casing 31 pushed by the collar 32R abutting the retaining ring 31b also move rightward because of the biasing force of the spring 70 or the collar 32L abutting against the collar 32R.

However, as mentioned above, the tooth space bottoms of the splines 15*a* of the spline hub 15 are sloped so as to keep the engagement of the clutch teeth 16*a* with the clutch teeth 14*a*. Therefore, the removal of the clutch teeth 16*a* from the clutch teeth 14*a* requires the manipulation force to shift the shifter shaft 35 from the backward traveling setting position to the neutral setting position, which exceeds the biasing force of the spring 70. In other words, the clutch teeth 16*a* must be removed from the clutch teeth 14*a* before the shifter shaft 35 moved from the backward traveling setting position reaches the neutral setting position.

In this regard, due to the above-mentioned second dimension setting, the pitch L2 is longer than the total of the engagement depth L6 and the gap L1. This dimension setting has the effect of removal of the clutch teeth 16*a* from the clutch teeth 14*a* prior to the shift of the shifter shaft 35 from the backward traveling setting position to the neutral setting position. The gear shifting slider 16 must move to cover the engagement depth L6 so as to remove the clutch teeth 16*a* from the clutch teeth 14*a*. Considering the elasticity of the spring 70, the maximum possible length of movement of the shifter casing 31 for moving the gear shifting slider 16 to cover the engagement depth L6 corresponds to the total of the engagement depth L6 and the gap L1. Since the total of the engagement depth L6 and the gap L1 is shorter than the pitch L2, the gear shifting slider 16 can reach a position where the clutch teeth 16*a* are removed from the clutch teeth 14*a* before the shifter shaft 35 moved from the backward traveling setting position reaches the neutral setting position.

The elasticity of the spring 70 reduces the transmission of the manipulation force from operation means 50 to the shifter casing 31. However, after the spring 70 is fully compressed or after the facing ends of the collars 32L and 32R abut against each other, the retaining ring 36L defines a limit position of the shifter casing 31 moved relative to the shifter shaft 35 and holds the shifter casing 31 at the limit position relative to the shifter shaft 35 while the shift shaft 35 is moved to the neutral setting position. Therefore, the manipulation force can be efficiently transmitted to the shifter casing 31 so as to surely shifting the gear shifting slider 16 to the neutral setting position.

The effective transmission of the manipulation force from the operation means 50 to the slider-shift means 30, overcoming the elasticity of the spring 70, is also advantageous in the following situation. When a vehicle is stationary and the output shafts 1L and 1R are braked, the braked output side of the gear shifting mechanism causes a torque. If the input side of the gear shifting mechanism receives an inertial rotation torque from the belt transmission or the HST on the upstream of the gear shifting mechanism, a large force (far from the biasing force of the spring 70) is required to remove the clutch teeth 16*a* from the clutch teeth 14*a*. However, due to the second dimension setting, the large manipulation force for shifting the shifter shaft 35 is surely transmitted to the gear shifting slider 16 until the clutch teeth 16*a* are removed from the clutch teeth 14*a*.

The above-mentioned function and effect of the gear shifting mechanism are the same in the case of the gear shifting operation of shifting the shifter shaft 35 from the forward traveling setting position to the neutral setting position for shifting the gear shifting slider 16 from the forward traveling position to the neutral position.

Another gear shifting mechanism according to a second embodiment will be described with reference to FIGS. 8 to 10. This gear shifting mechanism has elastic means disposed out of the transmission casings 90L and 90R so as to be interposed between operation means 80 and slider-shift means 38.

The operation means 80 comprises a horizontal detent arm 81 operatively connected to a gear shifting manipulator (such as a lever). A top wall of the transmission casing 90R is formed as a boss 92*a* having a boss hole 92, through which a vertical rotary shaft 82 is rotatably passed so as to project upward from the top of the transmission casing (the joined transmission casings 90L and 90R). The detent arm 81 is relatively rotatably provided on a top end of the rotary shaft 82. A horizontal outer shifter arm 84 is fixed on the portion of the rotary shaft 82 projecting upward from the transmission casing below the detent arm 81. A horizontal inner shifter arm 83 is fixed on a bottom end of the rotary shaft 82 in the transmission casing. The rotary shaft 82, the inner shifter arm 83 and the outer shifter arm 84, which are integrally rotatable, are defined as parts of the slider-shift means 38 in the second embodiment. A spring 85 serves as the elastic means interposed between the operation means 80 and the slider-shift means 38.

Figure 8:
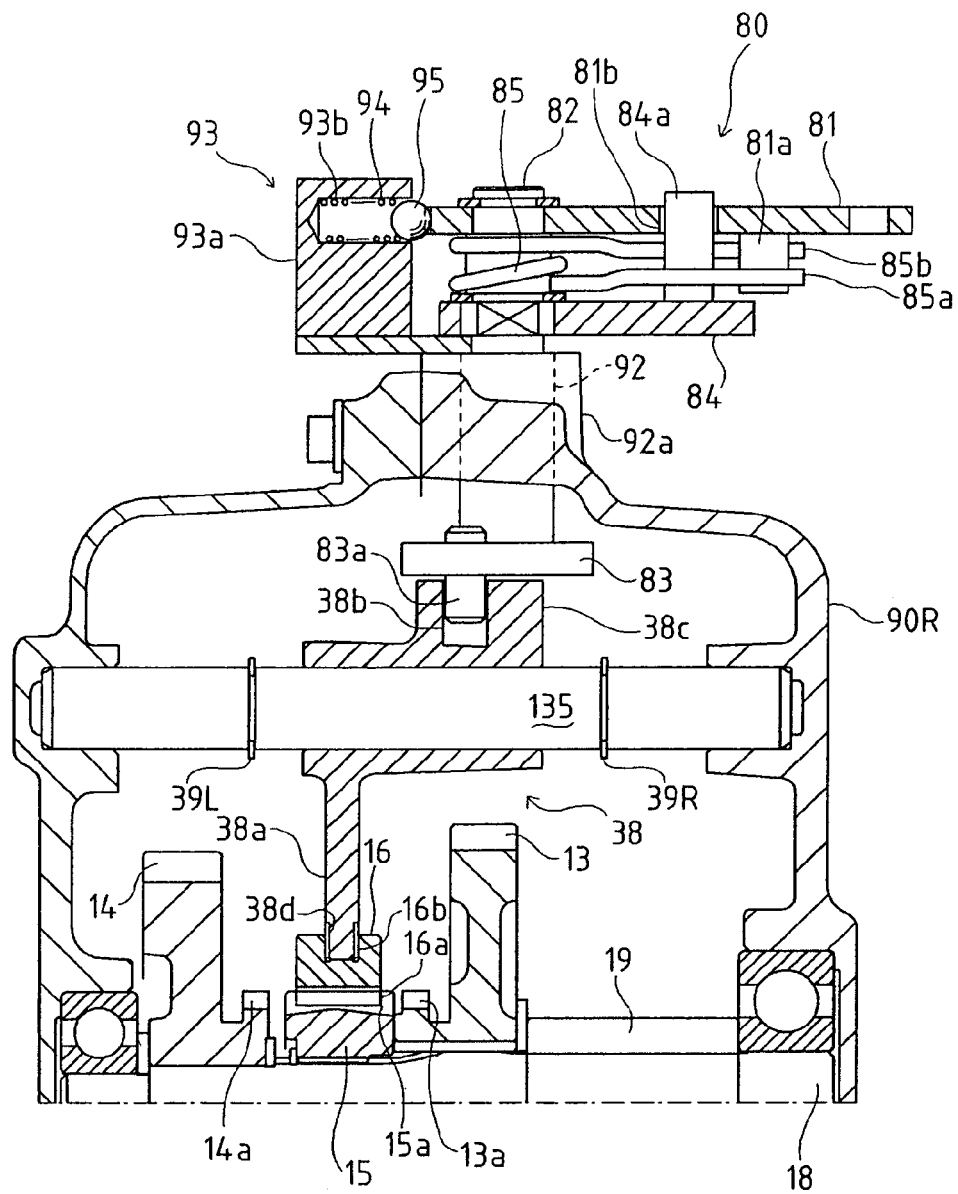
FIG. 8 is a sectional rear view of a gear shifting mechanism according to a second embodiment of the present invention.
Figure 9:
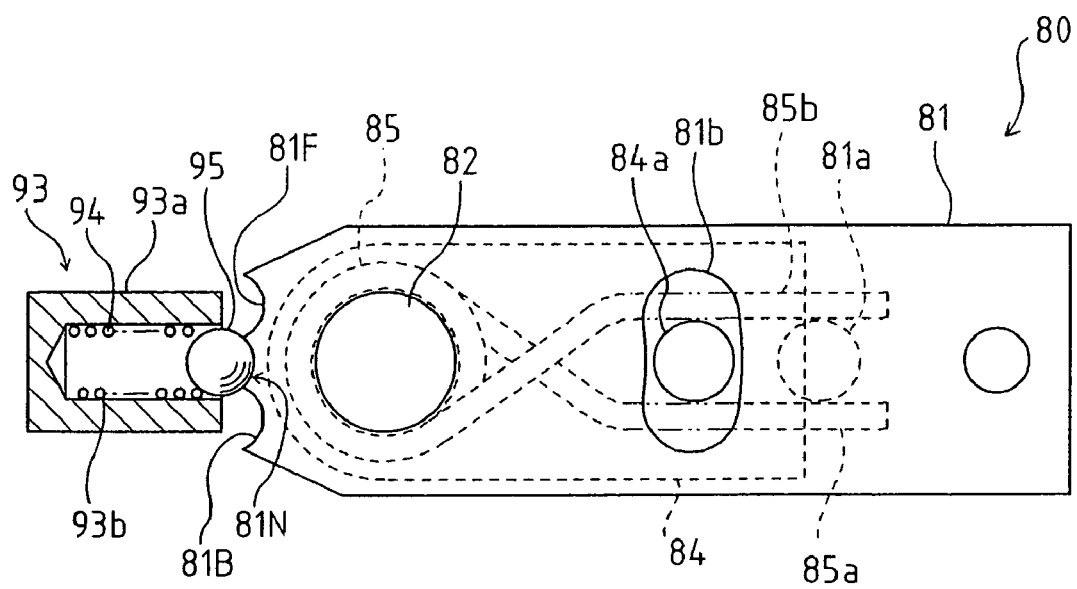
FIG. 9 is a plan view partly in section of an upper part of the gear shifting mechanism according to the second embodiment disposed above a transmission casing.

As shown in FIG. 8, in the transmission casing, a shifter shaft 135 is supported at both ends thereof so as not to be axially slidable against the transmission casings 90L and 90R. A shifter 38*c* as a part of the slider-shift means 38 is axially slidably provided on the shifter shaft 135. The slidable range of the shifter 38*c* is limited by retaining rings 39L and 39R fixed on the shifter shaft 135. The shifter 38*c* has an upwardly open recess 38*b*, into which an engaging pin 83*a* fixedly projecting downward from the inner shifter arm 83 is inserted so as to convert the rotation of the rotary shaft 82 to the axial movement of the shifter 38*c* along the shifter shaft 135.

A shifter fork 38*a*, having a shifter pawl 38*d*, projects from the shifter 38*c* so as to fit the shifter pawl 38*d* into the peripheral groove 16*b*. Accordingly, the gear shifting slider 16 is slidable integrally with the shifter. 38*c*.

A pin 81*a* fixedly projects downward from a lower surface of the detent arm 81. A pin 84*a* fixedly projects upward from an upper surface of the outer shifter arm 84 and is passed through a slot 81*b* formed in the detent arm 81. As shown in FIG. 9, the slot 81*b* is elongated so as to allow the pin 84*a* therein to rotate around the vertical axis of the rotary shaft 82 relative to the arm 81 to a predetermined length (corresponding to a later-discussed angle R3). In other words, opposite ends of the slot 81*b* define limit positions of the outer shifter arm 84 moved relative to the detent arm 81. The spring 85 is coiled on the rotary shaft 82, and both end portions 85*a* and 85*b* thereof are twisted to cross each other, and extended to pinch the pins 81*a* and 84*a* therebetween. When the detent arm 81 is rotated, the spring 85 biases the outer shifter arm 84 to rotate following the detent arm 81.

As shown in FIG. 8, detent means 93 is provided adjacent to the upwardly projecting portion of the rotary shaft 82 above the transmission casing, opposite to the extension direction of the arms 81 and 84. A detent casing 93*a* is fixed onto the top surface of the boss 92*a* of the transmission casing 90R. The detent casing 93*a* is formed therein with a horizontal hole 93*b* extended radially with respect to the center axis of the rotary shaft 82. The horizontal hole 93*b* is open at one end toward the detent arm 81 and closed at the opposite end. The detent arm 81 is formed with detent recesses 81F, 81N and 81B at an end edge thereof facing the detent casing 93*a*. A spring 94 and a ball 95 biased by the spring 94 toward the detent arm 81 are disposed in the hole 93*b*. The ball 95 biased by the spring 94 is selectively engaged in one of the detent grooves 81F, 81N and 81B so as to detent the detent arm 81 at one of its three rotational shift positions, i.e., a forward traveling setting position, a neutral setting position and a backward traveling setting position.

Figure 10:
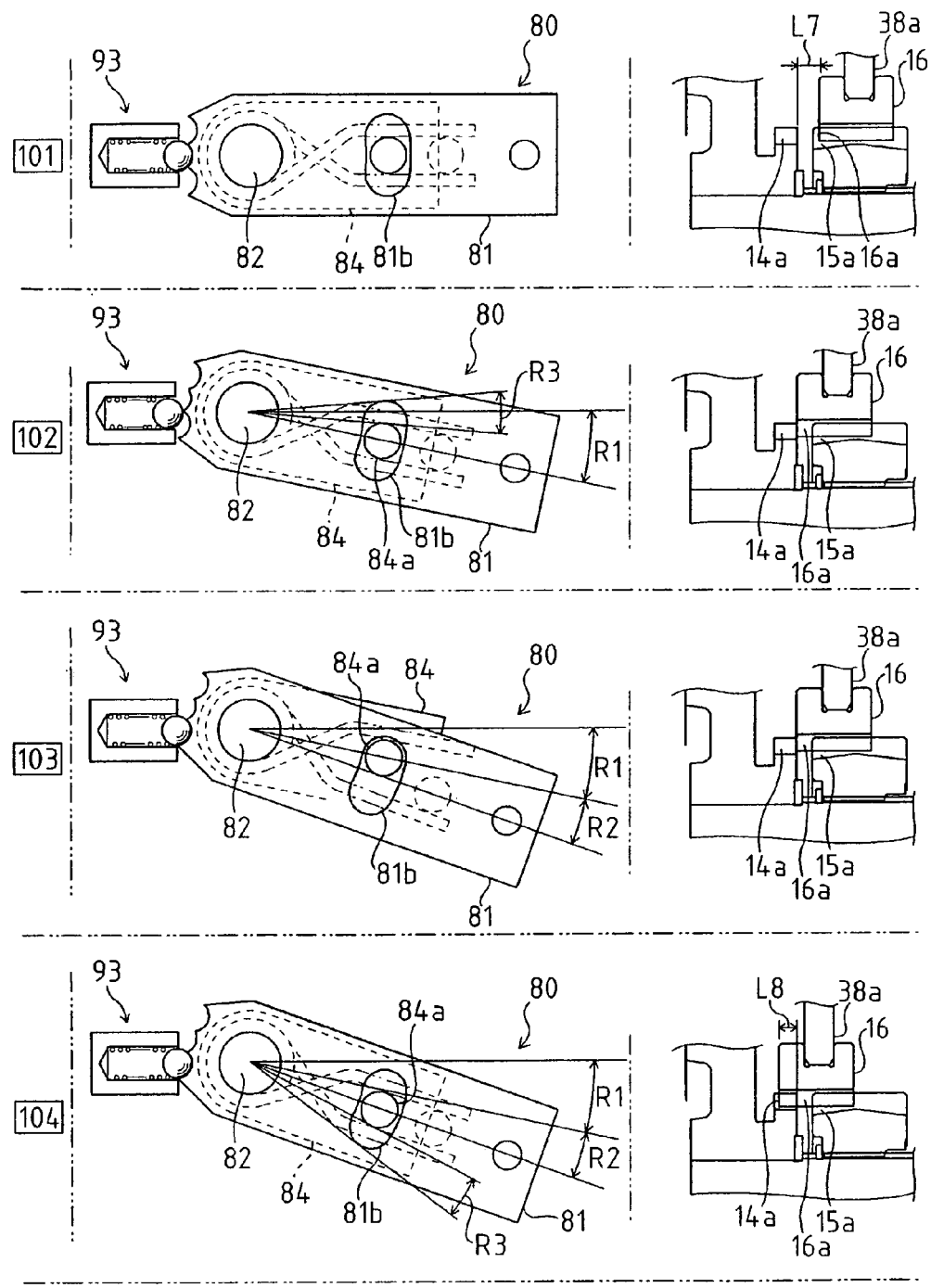
FIG. 10 illustrates a process from a first step to a fourth step for shifting the gear shifting slider by using the gear shifting mechanism according to the second embodiment.

FIG. 10 illustrates a process including steps 101, 102, 103, and 104 of shifting the outer shifter arm 84 and the gear shifting slider 16 by manipulation to shift the detent arm 81 from the neutral setting position to the backward traveling setting position.

At the first step 101, when the detent arm 81 is disposed at the neutral setting position (where the ball 95 is engaged in the detent recess 81N) and the gear shifting slider 16 is disposed at the neutral position (where the clutch teeth 16a engage with only the splines 15a), a gap L7 is ensured between the flat left end surface of the clutch teeth 16a of the gear shifting slider 16 and the flat right end surface of the clutch teeth 14a. The pin 84a is disposed at the center portion of the slot 81b.

During a process from the first step 101 to the second step 102 on the way of rotation of the detent arm 81 from the neutral setting position to the backward traveling setting position (the ball 95 is disposed between the detent recesses 81N and 81B), the outer shifter arm 84 as a part of the slider-shift means 38 is rotated substantially integrally with the detent arm 81 by the biasing force of the spring 85, so that the gear shifting slider 16 moves to cover the gap L7 and reaches a gear abutting position where the flat left end surface of the clutch teeth 16a abuts against the flat right end surface of the clutch teeth 14a.

If the rotation phase of the clutch teeth 14a does not agree with that of the clutch teeth 16a, the third step 103 is established. During a process from the second step 102 to the third step 103, the detent arm 81 is rotated to reach the backward traveling setting position (where the ball 95 is engaged in the detent recess 81B). Meanwhile, the clutch teeth 16a are prevented from entering the tooth spaces of the clutch teeth 14a, whereby the outer shifter arm 84 remains at the gear abutting position of the step 102. While the end portion 85a of the spring 85 is pushed by the pin 81a, the end portion 85b of the spring 85 is retained by the pin 84a. The elasticity of the spring 85 and the length of the slot 84a allow the relative movement of the arms 81 and 84, i.e., the delay of the slider-shift means 38 after the operation means 80.

To ensure the delay of the slider-shift means, i.e., to complete the gear shifting operation of shifting the detent arm 81 from the neutral setting position to the backward traveling setting position prior to the completion of shifting the gear shifting slider 16 from the neutral position to the backward traveling position, a third dimension setting is provided as follows.

Since the rotation of the outer shifter arm 84 is substantially integral with that of the detent arm 81, a rotation angle R1 of the detent arm 81 during the process from the step 101 to the step 102 agrees with the rotation angle of the outer shifter arm 84 corresponding to the movement of the gear shifting slider 16 from the neutral position to the gear abutting position such as to cover the gap L7.

A rotation angle R2 of the detent arm 81 during the process from the step 102 to the step 103 corresponds to the rotation angle which the outer shifter arm 84 requires to move the gear shifting slider 16 from the gear abutting position to the backward traveling position. A total of the rotation angles R1 and R2 is required to rotate the detent arm 81 from the neutral setting position to the backward traveling setting position.

A rotation angle R3 of the pin 84a from a center portion of the slot 81b to an end of the slot 81b corresponds to the movable range of the slider-shift means 38 (together with the gear shifting slider 16) relative to the operation means 80 (including the detent arm 81) for retaining the gear shifting slider 16 at the gear abutting position after the detent arm 81 reaches the backward traveling setting position.

According to the third dimension setting, the angle R2 is smaller than the angle R3. Therefore, the detent arm 81 surely reaches the backward traveling setting position while the gear shifting slider 16 remains at the gear abutting position.

At the moment the rotation phases come to agree with each other, the outer shifter arm 84 starts to rotate by the biasing force of the spring 85. During a process from the third step 103 to the fourth step 104, the gear shifting slider 16 moves to cover a length L8, which corresponds to a proper depth of the clutch teeth 16a engaging with the clutch teeth 14a. At the step 104, the gear shifting slider 16 reaches the backward traveling position where the clutch teeth 16a properly engages with the splines 15a and the clutch teeth 14a, thereby completing the gear shifting for backward traveling.

The above process is the same in the case of the gear shifting operation of shifting the detent arm 81 from the neutral setting position to the forward traveling setting position for shifting the gear shifting slider 16 from the neutral position to the forward traveling position.

During a process from the step 104 to the step 101, i.e., when the detent arm 81 is rotated from the backward traveling setting position (or the forward traveling setting position) to the neutral setting position, the outer shifter arm 84 rotates so as to follow the rotation of the detent arm 81 by the biasing force of the spring 85. The gear shifting slider 16 is moved rightward (or leftward) integrally with the outer shifter arm 84 so as to disengage the clutch teeth 16a from the clutch teeth 14a (or 13a).

To remove the clutch teeth 16a from the clutch teeth 14a (or 13a), i.e., to move the gear shifting slider 16 rightward (or leftward) so as to cover the length L8, the outer shifter arm 84 is required to rotate at the angle R2. However, as mentioned above, the tooth space bottoms of the splines 15a of the spline hub 15 are sloped so as to keep the engagement of the clutch teeth 16a with the clutch teeth 14a (or 13a). If the biasing force of the spring 85 is insufficient for the clutch teeth 16a to overcome the sloped tooth space bottoms of the splines 15a, the outer shifter arm 84 is delayed after the shift of the detent arm 81. The allowed maximum rotation angle of the detent arm 81 relative to the outer shifter arm 84 is the angle R3.

Therefore, while a total of the angles R1 and R2 corresponds to the whole rotation range of the detent arm 81 from the backward (or forward) traveling setting position to the neutral setting position, a total of the angles R3 and R2 corresponds to the required maximum rotation angle of the detent arm 81 for removing the clutch teeth 16a from the clutch teeth 14a (or 13a).

To surely remove the clutch teeth 16a from the clutch teeth 14a (or 13a) even if the biasing force of the spring 85 is insufficient, the manipulation force of shifting the detent arm 81 from the backward (or forward) traveling setting position to the neutral setting position must be effectively applied to the gear shifting slider 16 without being reduced by the elasticity of the spring 85. In other words, the clutch teeth 16a must be removed from the clutch teeth 14a before the detent arm 81 moved from the backward (or forward) traveling setting position reaches the neutral setting position.

In this regard, according to a fourth dimension setting, the angle R3 is shorter than the angle R1. As a result, the total of the angles R3 and R2 becomes smaller than the total of the angles R1 and R2. In other words, the required rotation range of the detent arm 81 for removing the clutch teeth 16*a* from the clutch teeth 14*a* (or 13*a*) is smaller than the rotation range of the detent arm 81 from the backward (or forward) traveling setting position to the neutral setting position. Therefore, the clutch teeth 16*a* is surely removed from the clutch teeth 14*a* before the detent arm 81 moved from the backward (or forward) traveling setting position reaches the neutral setting position.

The elasticity of the spring 85 reduces the transmission of the manipulation force from the detent arm 81 (i.e., the operation means 80) to the outer shifter arm 84 (i.e., the slider-shift means 38). However, after the pin 84*a* of the arm 84, moved relative to the arm 81 by the elasticity of the spring 85, reaches a position where the end portions 85*a* and 85*b* of the spring 85 are fully expanded or one of the opposite ends of the slot 81*b* abut against the pin 84*a*, the outer shifter arm 84 with the pin 84*a* is retained at the limit position relative to the detent arm 81 while the detent arm 81 is rotated to the neutral setting position. Therefore, the manipulation force overcoming the elasticity of the spring 85 can be efficiently transmitted to the slider-shiftmeans 38 so as to surely shift the gear shifting slider 16 to the neutral position.

As a result, even if a very large force is required to shift the gear shifting slider 16 to the neutral position, e.g., in such a state that the input side of the gear shifting mechanism receives an inertial rotation torque from the belt transmission or the HST on the upstream of the gear shifting mechanism while the output shafts 1L and 1R are braked, the large manipulation force for rotating the detent arm 81 is surely transmitted to the gear shifting slider 16 until the clutch teeth 16*a* are removed from the clutch teeth 14*a* (or 13*a*).

After the removal of the clutch teeth 16*a* from the clutch teeth 14*a* (or 13*a*), the gear shifting slider 16 may be moved to the neutral position by only the biasing force of the spring 85. When the gear shifting slider 16 reaches the neutral position, the pin 84*a* of the outer shifter arm 84 reaches the center portion of the slot 81*b*.

The external parts of the gear shifting mechanism, including the arms 81 and 84, the spring 85, and the detent means 93, can be assembled onto the rotary shaft 82 out of the transmission casings 90L and 90R after the parts of the axle drive system 1 in the transmission casings 90L and 90R, including the internal parts of the slider-shift means 38, such as the shifter 38*c* and the inner shifter arm 83, are assembled. Therefore, angles of the arms 81 and 84 relative to the shaft 82, a reaction force of the spring 85, and the like can be easily adjusted so as to reduce the individual difference of operational feeling among the various axle drive systems 1.

Figure 11:
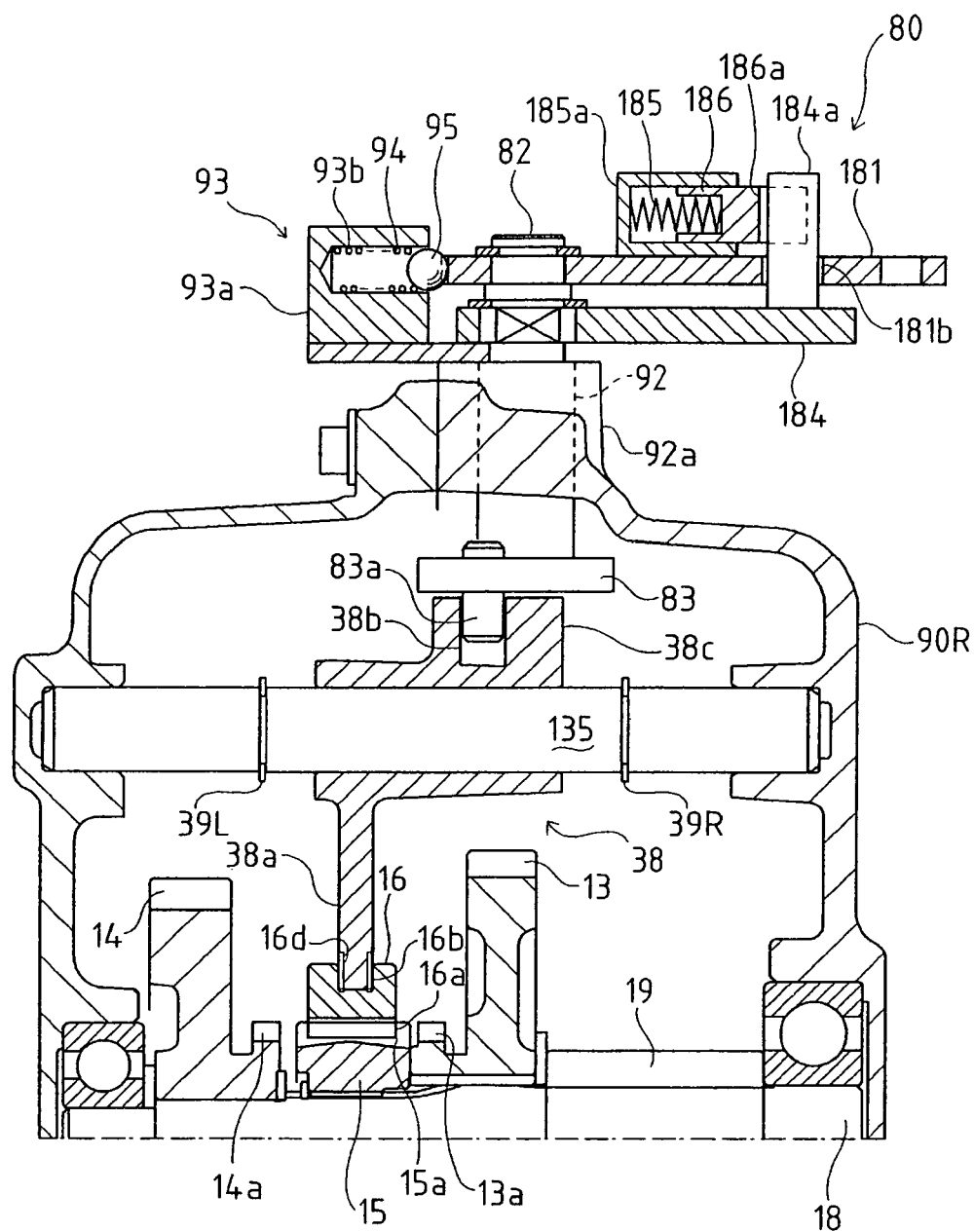
FIG. 11 is a sectional rear view of a gear shifting mechanism according to a third embodiment of the present invention.
Figure 12:
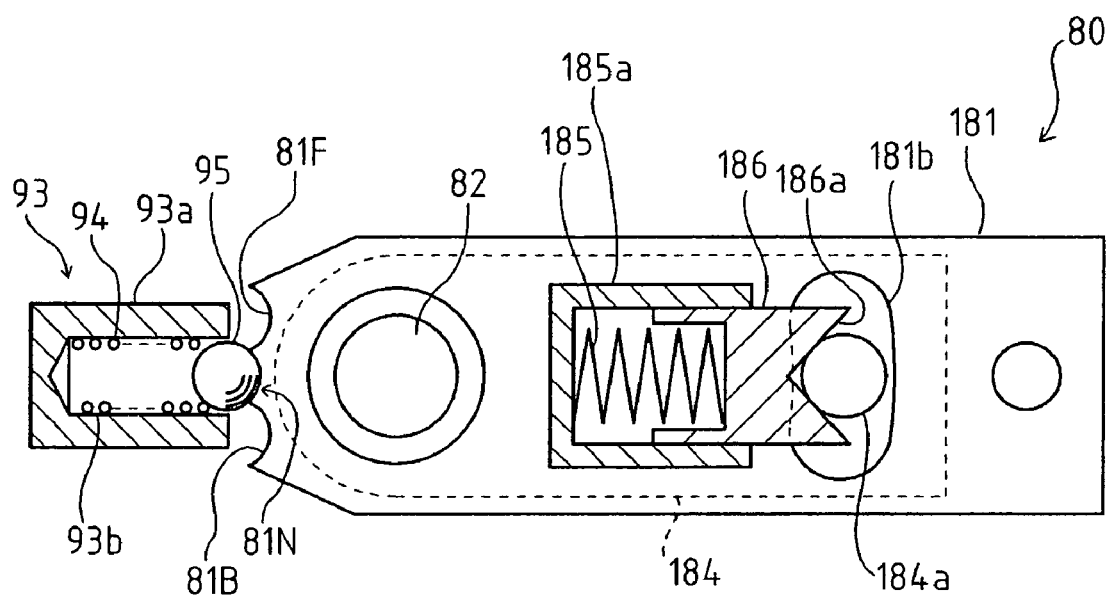
FIG. 12 is a plan view partly in section of an upper part of the gear shifting mechanism according to the third embodiment disposed above a transmission casing.

Another gear shifting mechanism according to a third embodiment will be described with reference to FIGS. 11 and 12. This gear shifting mechanism is similar to the gear shifting mechanism according to the second embodiment shown in FIGS. 8 to 10, excluding elastic means 185. In FIGS. 11 and 12, each of the same members of the second embodiment is designated by the same reference numeral, and has the same function. Description of such members is omitted.

Above the transmission casing (the joined transmission casings 90L and 90R), a detent arm 181 corresponding to the detent arm 81 of the second embodiment is relatively rotatably provided onto the top end of the rotary shaft 82, and an outer shifter arm 184 corresponding to the outer shifter arm 84 of the second embodiment is fixed onto the rotary shaft 82 below the detent arm 181. Similar to the pin 84*a* inserted into the slot 81*b*, a pin 184*a* fixedly projects upward from the outer shifter arm 184 and inserted into a vertically penetrating slot 181*b* formed in the detent arm 181. The pin 184*a* projects upward from a top surface of the detent arm 181.

A casing 185*a* is fixed on the top surface of the detent arm 181. The casing 185*a* is open toward the pin 184*a*. A stopper 186 is slidably fitted into the casing 185*a*. An end of the stopper 186 projecting from the opening of the casing 185*a* is notched to form a V-shaped groove 186*a*. The pin 184*a* is inserted into the V-shaped groove 186*a*. When the pin 184*a* is disposed at a center portion of the slot 181*b*, the pin 184*a* is held in the deepest portion of the groove 186*a*. As the pin 184*a* goes from the center portion to one of opposite ends in the slot 181*b*, the depth of the pin 184*a* in the groove 186*a* is reduced so that the stopper 186 is pushed into the casing 185*a* and compresses the spring 185. The compressed spring 185 biases the pin 184*a* to the center portion of the slot 181*b*.

When the detent arm 181 is rotated from the neutral setting position (where the ball 95 is engaged in the detent recess 81N) to the forward or backward traveling setting position (where the ball is engaged in the detent recess 81F or 81B), the outer shifter arm 184 having the pin 184*a* held in the deepest portion of the groove 181*b* is rotated integrally with the detent arm 181.

After the gear shifting slider 16 reaches the gear abutting position and the rotation phase of the clutch teeth 16*a* does not agree with that of the clutch teeth 13*a* or 14*a*, the detent arm 181 further rotates to the forward or backward traveling setting position while leaving the outer shifter arm 184 at the position corresponding to the gear abutting position of the gear shifting slider 16. During this process, the pin 184*a* moves in the groove 186*a* so as to reduce its depth therein, whereby the spring 185 is compressed to bias the pin 184*a* toward the deepest portion of the groove 186*a* (the center portion of the slot 181*b*).

As soon as the rotation phase of the clutch teeth 16*a* comes to agree with that of the clutch teeth 13*a* or 14*a*, the biasing force of the spring 185 causes the outer shifter arm 184 to rotate so as to move the pin 184*a* to the center portion of the slot 181*b*, whereby the gear shifting slider 16 is smoothly moved to the forward or backward traveling position where the clutch teeth 16*a* properly engage with the clutch teeth 13*a* or 14*a*.

The length of the slot 181*b*, defining the movement of the outer shifter arm 184 (i.e., the slider-shift means 38) relative to the detent arm 181 (i.e., the operation means 80) is determined according to the third and fourth dimension setting.

Although the invention has been described in its preferred form with a certain degree of particularity, it is understood that the present disclosure of the preferred form can be changed in the details of construction, and the combination and arrangement of parts may be adjusted, without departing from the spirit and the scope of the invention as hereinafter claimed.

What is claimed is:

1. A gear shifting mechanism of an axle drive system, comprising:
    a shaft drivingly connected to an axle;
    a first clutch gear relatively rotatably provided on the shaft, the first clutch gear having first clutch teeth;
    a second clutch gear relatively rotatably provided on the shaft, the second clutch gear having second clutch teeth;

a spline hub fixed on the shaft between the first and second clutch gears;

a gear shifting slider axially slidably and not relatively rotatably fitted on the spline hub, the gear shifting slider having third clutch teeth, wherein end surfaces of the first, second and third clutch teeth facing one another are flat, wherein the gear shifting slider can be shifted among a neutral position, a first stage position and a second stage position, wherein, when the gear shifting slider is disposed at the neutral position, the third clutch teeth engages with none of the first and second clutch teeth, wherein, when the gear shifting slider is disposed at the first stage position, the third clutch teeth engages with not the second clutch teeth but the first clutch teeth, and wherein, when the gear shifting slider is disposed at the second stage position, the third clutch teeth engages with not the first clutch teeth but the second clutch teeth;

slider-shift means integrally movably interlocking with the gear shifting slider;

operation means operatively interposed between the slider-shift means and a gear shifting manipulator, wherein the operation means can be shifted among a neutral setting position for setting the gear shifting slider at the neutral position, a first stage setting position for setting the gear shifting slider at the first stage position, and a second stage setting position for setting the gear shifting slider at the second stage position, and wherein the slider-shift means can be movable relative to the operation means to some degree so as to be delayed after the shift of the operation means; and elastic means interposed between the slider-shift means and the operation means, wherein the elasticity of elastic means allows the movement of the slider-shift means relative to the operation means, and biases the third clutch teeth to engage with either the first or second clutch teeth, and wherein the slider-shift means includes a casing through which a part of the operation means is relatively movably passed, wherein the elastic means is disposed in the casing so as to be interposed between the slider-shift means and the operation means.

2. The gear shifting mechanism as set forth in claim 1, further comprising:

a casing incorporating the shaft, the first clutch gear, the second clutch gear, the spline hub, the gear shifting slider, and a shifter, wherein the elastic means is disposed out of the casing so as to be interposed between the slider-shift means and the operation means.

3. The gear shifting mechanism as set forth in claim 1, wherein the movable range of the slider-shift means relative to the operation means and gaps among the first, second and third clutch teeth are set so as to enable the gear shifting slider to be completely shifted from the neutral position to the first or second stage position after the operation means is completely shifted from the neutral setting position to the first or second stage setting position.

4. The gear shifting mechanism as set forth in claim 1, wherein the movable range of the slider-shift means relative to the operation means and depths of engagement of the third clutch teeth into the first and second clutch teeth are set so as to enable the third clutch teeth to be removed from the first or second clutch teeth before the operation means is completely shifted from the first or second stage setting position to the neutral setting position.

5. The gear shifting mechanism as set forth in claim 1, wherein bottoms of tooth spaces of the spline hub are upwardly sloped toward a center portion thereof so that end sides thereof facing to the clutch teeth of the first and second clutch gears are deeper than the center portion.

6. The gear shifting mechanism as set forth in claim 1, wherein, after the slider-shift means moved by the elasticity of the elastic means reaches a limit position thereof relative to the operation means, the slider-shift means is held at the limit position relative to the operation means during the shift of the operation means.

7. A gear shifting mechanism of an axle drive system, comprising: a shaft drivingly connected to an axle;

a first clutch gear relatively rotatably provided on the shaft, the first clutch gear having first clutch teeth;

a second clutch gear relatively rotatably provided on the shaft, the second clutch gear having second clutch teeth;

a spline hub fixed on the shaft between the first and second clutch gears;

a gear shifting slider axially slidably and not relatively rotatably fitted on the spline hub, the gear shifting slider having third clutch teeth, wherein end surfaces of the first, second and third clutch teeth facing one another are flat, wherein the gear shifting slider can be shifted among a neutral position, a first stage position and a second stage position, wherein, when the gear shifting slider is disposed at the neutral position, the third clutch teeth engages with none of the first and second clutch teeth, wherein, when the gear shifting slider is disposed at the first stage position, the third clutch teeth engages with not the second clutch teeth but the first clutch teeth, and wherein, when the gear shifting slider is disposed at the second stage position, the third clutch teeth engages with not the first clutch teeth but the second clutch teeth;

slider-shift means integrally movably interlocking with the gear shifting slider;

operation means operatively interposed between the slider-shift means and a gear shifting manipulator, wherein the operation means can be shifted among a neutral setting position for setting the gear shifting slider at the neutral position, a first stage setting position for setting the gear shifting slider at the first stage position, and a second stage setting position for setting the gear shifting slider at the second stage position, and wherein the slider-shift means can be movable relative to the operation means to some degree so as to be delayed after the shift of the operation means; and elastic means interposed between the slider-shift means and the operation means, wherein the elasticity of elastic means allows the movement of the slider-shift means relative to the operation means, and biases the third clutch teeth to engage with either the first or second clutch teeth, wherein, after the slider-shift means moved by the elasticity of the elastic means reaches a limit position thereof relative to the operation means, the slider-shift means is held at the limit position relative to the operation means during the shift of the operation means.

8. The gear shifting mechanism as set forth in claim 7, the slider-shift means including a casing through which a part of the operation means is relatively movably passed, wherein the elastic means is disposed in the casing so as to be interposed between the slider-shift means and the operation means.

9. The gear shifting mechanism as set forth in claim 7, further comprising:

a casing incorporating the shaft, the first clutch gear, the second clutch gear, the spline hub, the gear shifting slider, and a shifter, wherein the elastic means is disposed out of the casing so as to be interposed between the slider-shift means and the operation means.

10. The gear shifting mechanism as set forth in claim 7, wherein the movable range of the slider-shift means relative to the operation means and gaps among the first, second and third clutch teeth are set so as to enable the gear shifting slider to be completely shifted from the neutral position to the first or second stage position after the operation means is completely shifted from the neutral setting position to the first or second stage setting position.

11. The gear shifting mechanism as set forth in claim 7, wherein the movable range of the slider-shift means relative to the operation means and depths of engagement of the third clutch teeth into the first and second clutch teeth are set so as to enable the third clutch teeth to be removed from the first or second clutch teeth before the operation means is completely shifted from the first or second stage setting position to the neutral setting position.

12. The gear shifting mechanism as set forth in claim 7, wherein bottoms of tooth spaces of the spline hub are upwardly sloped toward a center portion thereof so that end sides thereof facing to the clutch teeth of the first and second clutch gears are deeper than the center portion.

* * * * *